(12) United States Patent
Inakoshi et al.

(10) Patent No.: US 7,331,517 B2
(45) Date of Patent: Feb. 19, 2008

(54) ARTICLE READER PROGRAM, ARTICLE MANAGEMENT METHOD AND ARTICLE READER

(75) Inventors: Hiroya Inakoshi, Kawasaki (JP); Seishi Okamoto, Kawasaki (JP); Tatsuya Asai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 260 days.

(21) Appl. No.: 11/182,941

(22) Filed: Jul. 15, 2005

(65) Prior Publication Data

US 2006/0213976 A1    Sep. 28, 2006

(30) Foreign Application Priority Data

Mar. 23, 2005 (JP) ............................. 2005-082859

(51) Int. Cl.
*G06K 5/00* (2006.01)
(52) U.S. Cl. ...................................... 235/380; 235/375
(58) Field of Classification Search ................ 235/380, 235/383, 382.5, 375; 701/200; 707/3, 1, 707/10
See application file for complete search history.

(56) References Cited

U.S. PATENT DOCUMENTS

| | | | |
|---|---|---|---|
| 5,442,561 A * | 8/1995 | Yoshizawa et al. | ......... 700/100 |
| 6,727,930 B2 | 4/2004 | Currans et al. | |
| 6,772,160 B2 * | 8/2004 | Cho et al. | ...................... 707/10 |
| 2003/0014383 A1 * | 1/2003 | Cho et al. | ...................... 707/1 |
| 2004/0133342 A1 * | 7/2004 | Banker | ....................... 701/200 |
| 2005/0044071 A1 * | 2/2005 | Cho et al. | ...................... 707/3 |
| 2006/0213976 A1 * | 9/2006 | Inakoshi et al. | ............ 235/380 |

OTHER PUBLICATIONS

S. Chakrabarti; "Mining the Web-Discovering Knowledge from Hypertext Data"; Morgan Kaufman, Pub. 2003; pp. 81-89; 133-136; 147-152.

* cited by examiner

*Primary Examiner*—Thien Minh Le
(74) *Attorney, Agent, or Firm*—Greer, Burns & Crain, Ltd.

(57) ABSTRACT

An article reader program of this invention comprises: detecting that a display of data concerning a first article is instructed by a user; calculating an article relevance degree between the first article and a second article; extracting the second article whose article relevance degree with the first article satisfies a predetermined condition in relation to the first article; assigning a top priority to the first article; assigning a priority lower than the top priority of the first article to the extracted second article; and displaying the data concerning the first article and data concerning the extracted second article according to the assigned priorities of the first article and the extracted second article.

19 Claims, 26 Drawing Sheets

```
<item rdf:about="http://xyz.com/business/2005/01/post.html?ref=rss">
    <title>YEN RATE IN TOKYO, ONE DOLLAR = 102 YEN 05~07 SEN (AT 15:00)</title>
    <link>http://xyz.com/business/2005/01/post.html?ref=rss</link>
    <description>
        AT 3 PM 17 JANUARY, YEN MARKET EXCHANGES ONE DOLLAR TO
        102 YEN 05 SEN~07 SEN, DEPRECIATED BY 1 YEN FROM YESTERDAY'S
        CLOSING PRICE.
    </description>

<content:encoded>
    <![CDATA[
        AT 3 PM 17 JANUARY, YEN MARKET IS EXCHANGING ONE DOLLAR TO
        102 YEN 05 SEN~07 SEN, DEPRECIATED BY 1 YEN FROM YESTERDAY'S
        CLOSING PRICE. TENDENCY OF YEN'S DEPRECIATION···
    ]]>
    </content:encoded>

<dc:subject>ECONOMY</dc:subject>

<dc:creator>XYZ NEWS PUBLISHING COMPANY</dc:creator>

<dc:date>2005-01-17T18:01:15+09:00</dc:date>
</item>
```

FIG.3A

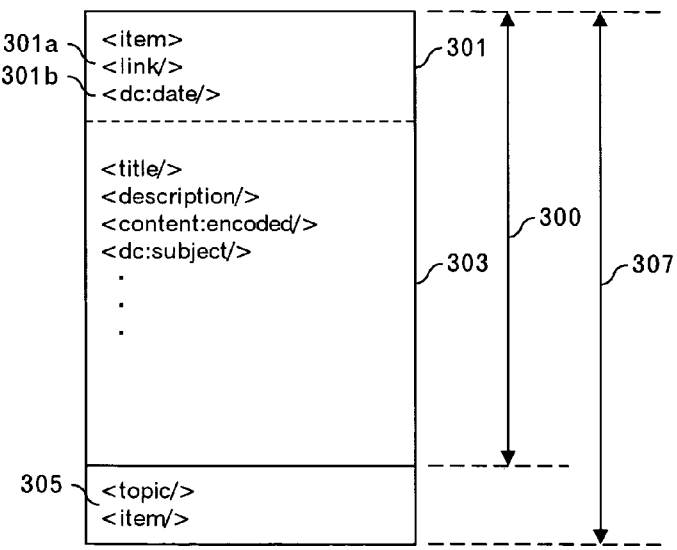

FIG.3B

|   | <link/> | <dc:date/> | <topic/> | <title/> |
|---|---|---|---|---|
| 1 | http://aaa | 2005-1-17 11:55:43 | EARTHQUAKE IN SUMATRA | EARTHQUAKE OFFSHORE IN SUMATRA, SAFETY OF JAPANESE |
| 2 | http://bbb | 2005-1-17 11:53:29 | EARTHQUAKE IN NIIGATA | EARTHQUAKE IN NIIGATA, LATEST NEWS |
| 3 | http://ccc | 2005-1-17 11:40:03 | BASEBALL | NEWS FLASH OF MAJOR LEAGUES |
| 4 | http://ddd | 2005-1-17 10:03:08 | SOCCER | NEWS FLASH OF SOCCER WORLD CUP |
| 5 | http://eee | 2005-1-16 22:27:10 | STOCK TRANSACTION | STOCK MARKET IN NY, CLOSING PRICE |
| 6 | http://fff | 2005-1-15 15:11:10 | TRADE | ABOUT IMPORT RELAXATION OF CARS |

| | <link/> (301a) | <dc:date/> (301b) | <topic/> (305) | <title/> |
|---|---|---|---|---|
| 1 | http://aaa | 2005-1-17 11:55:43 | DISASTER | EARTHQUAKE OFFSHORE IN SUMATRA, SAFETY OF JAPANESE |
| 2 | http://bbb | 2005-1-17 11:53:29 | DISASTER | EARTHQUAKE IN NIIGATA, LATEST NEWS |
| 3 | http://ccc | 2005-1-17 11:40:03 | SPORT | NEWS FLASH OF MAJOR LEAGUES |
| 4 | http://ddd | 2005-1-17 10:03:08 | SPORT | NEWS FLASH OF SOCCER WORLD CUP |
| 5 | http://eee | 2005-1-16 22:27:10 | ECONOMY | STOCK MARKET IN NY, CLOSING PRICE |
| 6 | http://fff | 2005-1-15 15:11:10 | ECONOMY | ABOUT IMPORT RELAXATION OF CARS |

FIG.14C

| | <link/> (301a) | <dc:date/> (301b) | <topic/> (305) | <title/> |
|---|---|---|---|---|
| 7 | http://ggg | 2005-1-17 12:00:15 | SPORT | NEWS FLASH OF PROFESSIONAL BASEBALL |
| 8 | http://hhh | 2005-1-17 12:03:32 | DISASTER | CHARITY FUND-RAISING FOR EARTHQUAKE IN NIIGATA |
| 9 | http://iii | 2005-1-17 12:26:40 | DISASTER | EARTHQUAKE OFFSHORE IN SUMATRA, LATEST NEWS |
| 10 | http://jjj | 2005-1-17 13:05:01 | ECONOMY | YEN RATE IN TOKYO, 105 YEN 15~25 SEN |

| DEGREE OF SIMILARITY | <dc:date/> | <title/> |
|---|---|---|
| A | 2005-1-17 12:26:40 | EARTHQUAKE OFFSHORE IN SUMATRA, LATEST NEWS |
| B1 | 2005-1-17 12:03:32 | CHARITY FUND-RAISING FOR EARTHQUAKE IN NIIGATA |
| C1 | 2005-1-17 12:00:15 | NEWS FLASH OF PROFESSIONAL BASEBALL |
| X1 | 2005-1-16 22:27:10 | STOCK MARKET IN NY, CLOSING PRICE |
| C2 | 2005-1-17 11:40:03 | NEWS FLASH OF MAJOR LEAGUES |
| B2 | 2005-1-17 11:53:29 | EARTHQUAKE IN NIIGATA, LATEST NEWS |
| A1 | 2005-1-17 11:55:43 | EARTHQUAKE OFFSHORE IN SUMATRA, SAFETY OF JAPANESE |

| DEGREE OF SIMILARITY | <dc:date/> | <topic/> | <title/> |
|---|---|---|---|
| A | 2005-1-17 12:26:40 | EARTHQUAKE OFFSHORE IN SUMATRA | EARTHQUAKE OFFSHORE IN SUMATRA, LATEST NEWS |
| A1 | 2005-1-17 11:55:43 | EARTHQUAKE OFFSHORE IN SUMATRA | EARTHQUAKE OFFSHORE IN SUMATRA, SAFETY OF JAPANESE |
| B1 | 2005-1-17 12:03:32 | — | CHARITY FUND-RAISING FOR EARTHQUAKE IN NIIGATA |
| C1 | 2005-1-17 12:00:15 | — | NEWS FLASH OF PROFESSIONAL BASEBALL |
| X1 | 2005-1-16 22:27:10 | — | STOCK MARKET IN NY, CLOSING PRICE |
| C2 | 2005-1-17 11:40:03 | — | NEWS FLASH OF MAJOR LEAGUES |
| B2 | 2005-1-17 11:53:29 | — | EARTHQUAKE IN NIIGATA, LATEST NEWS |

FIG.23C

| DEGREE OF SIMILARITY | <dc:date/> | <topic/> | <title/> |
|---|---|---|---|
| A | 2005-1-17 12:26:40 | EARTHQUAKE OFFSHORE IN SUMATRA | EARTHQUAKE OFFSHORE IN SUMATRA, LATEST NEWS |
| A1 | 2005-1-17 11:55:43 | EARTHQUAKE OFFSHORE IN SUMATRA | EARTHQUAKE OFFSHORE IN SUMATRA, SAFETY OF JAPANESE |
| B1 | 2005-1-17 12:03:32 | EARTHQUAKE IN NIIGATA | CHARITY FUND-RAISING FOR EARTHQUAKE IN NIIGATA |
| B2 | 2005-1-17 11:53:29 | EARTHQUAKE IN NIIGATA | EARTHQUAKE IN NIIGATA, LATEST NEWS |
| C1 | 2005-1-17 12:00:15 | BASEBALL | NEWS FLASH OF PROFESSIONAL BASEBALL |
| C2 | 2005-1-17 11:40:03 | BASEBALL | NEWS FLASH OF MAJOR LEAGUES |
| X1 | 2005-1-16 22:27:10 | — | STOCK MARKET IN NY, CLOSING PRICE |

ARTICLE READER PROGRAM, ARTICLE MANAGEMENT METHOD AND ARTICLE READER

TECHNICAL FIELD OF THE INVENTION

The present invention relates to a technique for efficiently managing article data provided in a network.

BACKGROUND OF THE INVENTION

Conventionally, an information offerer in the Internet was only one who had an advanced computer technique. However, by using a dedicated information providing program having templates and a plain user interface, a general Internet user has also come to be able to easily provide information on the Internet. As a result, in recent years, information provision via the Internet has started to become popular among general Internet users. One of triggers by which the number of general information offerers has increased as stated above is a system called a Weblog or a Blog. The Weblog is a system to write sentences and to manage sentence data in a simple operation. The Weblog was first recognized as a system for a personal use or a narrow use, for example, to write a diary and to allow familiar friends to browse it. However, journalists, writers, and experts in various fields open their Weblogs to the public widely and use them in order to disclose and exchange their opinions. Thus, at present, the Weblog is being recognized as a system having a wide use and being highly useful. Further, the Weblog is expected as an information providing medium with higher readiness.

As one of techniques to support the expectation for the Weblog as stated above, there is an RSS (RDF Site Summary). While data of the Weblog is relatively long article data, the RSS is composed of a date, an article summary of one line (or at most several lines), an article title, a link destination URL and the like. Because the RSS data is described in the XML (extensible Markup Language) format, it is hard for a user to read the data when no modification is made thereto. Then, the user uses a dedicated application called an RSS reader, and recognizes the RSS data as information. The user registers interesting Weblog sites in a bookmark of the RSS reader. The RSS reader periodically patrols the Weblog sites registered in the bookmark, downloads the RSS delivered by the site, and displays it. Thus, the user can immediately know the appearance of a newly-arrived article without patrolling the sites by his or her own operation. Besides, the RSS is applied not only to the Weblog sites but also to a news site, and further, its application to an e-commerce site, groupware and the like is also attempted.

There are plural kinds of RSS readers, and a ticker type and a mail-client type are typical. FIG. 27 shows a display example of RSS data by a conventional ticker type RSS reader. The ticker type RSS reader sequentially displays limited data (for example, only an article summary and an update date) among data included in the RSS acquired from the Weblog sites at predetermined time intervals. The ticker type RSS reader is excellent in that the ratio of occupation on the screen of a computer is small, a user operation to subscribe to an article is simple, and an operation is unnecessary when the user merely reads an article summary. Incidentally, the ticker type RSS reader can be obtained from some Web sites.

Besides, the mail-client type RSS reader has a user interface similar to a mail reader. In the mail-client type RSS reader, one article included in the RSS is dealt with similarly to one mail, and articles from Weblog sites are stored. The mail-client type RSS reader is characterized by providing abundant functions such as management of the articles according to being read or being not read, and retrieval of the articles. Incidentally, the mail-client type RSS reader can be obtained from some Web sites.

Besides, U.S. Pat. No. 6,727,930 discloses a technique relating to a portable information terminal having a streaming information display. According to this publication, the portable information terminal includes means for scrolling information and advertisement in a ticker-tape format scrolled or rotated across a limited portion of a screen. Thus, a large amount of information, together with the advertisement, can be displayed.

However, the conventional RSS reader has problems as described below.

When plural sites are registered in the bookmark of the RSS reader, there is a case where duplicate or similar articles are updated in two similar sites. Especially, in articles from news sites required to report speedily, such a tendency is often seen. Thus, as compared with the number of articles acquired by the RSS reader, the amount of knowledge obtained by the user is not increased. Especially, in the case of the ticker type RSS reader, because articles are sequentially displayed, the number of articles displayed in a fixed time is limited. As stated above, to display duplicate or similar articles is inefficient from the viewpoint of knowledge acquisition of the user.

When the number of sites registered in the bookmark of the RSS reader becomes large, the number of articles received in a fixed time becomes large. On the other hand, because the time allotted to the user to read articles is limited, there arises a problem that all articles received cannot be read. Thus, similarly to the case of the duplication or similarity of article information, as compared with the number of articles acquired by the RSS reader, the amount of knowledge obtained by the user is not increased. For example, in the ticker type RSS reader, because new articles are sequentially received before all articles are displayed, there often occurs a case where an article is not displayed. Besides, because the ticker type RSS reader sequentially displays articles, articles displayed at the time when the user does not see the article display part of the RSS reader because of being left from a seat or another working become articles which are overlooked. In the mail-client type RSS reader, although all received articles can be stored, the time allotted to the user to activate an application and to read articles is limited. Thus, because new articles are sequentially received before the reading of the already arrived articles is completed, an oversight of an article can occur. As stated above, the oversight of the article is inefficient from the viewpoint of knowledge acquisition of the user.

In some of the mail-client type RSS readers, in order to efficiently come in contact with article information, a folder management function is provided in which sites registered in the bookmark are classified according to a folder tree, and plural sites dealing with articles within similar categories are integrated into one category (holder). In such an RSS reader, when a holder corresponding to a category is selected, articles provided from the sites classified into the holder can be read. At a glance, this function appears to be useful. However, the holder management function does not often function effectively from reasons of (1) an optimum classification method of categories is changed according to the taste of the user and the like, (2) one site deals with plural categories, and the like.

Besides, in addition to the RSS reader having the management function using holders, an RSS reader having a keyword retrieval function already exists. The keyword retrieval function is a very useful function for the user in that even if articles are not managed in advance, means enabling the user to narrow objective articles is provided. For example, the article retrieval using the keyword is useful in the case where an object to be retrieved is clear, and a keyword relevant to the investigation object can be easily recalled. However, when the user reads a newly-arrived article, there are many cases where the object of article access is not determined. Thus, there is a problem that a situation in which the keyword retrieval function can be effectively used is limited.

When the problems as described above are summarized, the problems of the conventional RSS reader are that the user can not efficiently perform information acquisition and knowledge acquisition because of the duplication and similarity of articles, oversight, the trouble of management and the like.

SUMMARY OF THE INVENTION

In view of the above problems, an object of the invention is to provide a technique enabling a user to efficiently acquire articles provided on a network.

Besides, another object of the invention is to provide a technique to efficiently manage article data provided on a network.

An article reader program according to the invention comprises: detecting that a display of data concerning a first article (for example, data of an RSS document or an article summary, which may be stored in an article data storage) is instructed by a user; calculating an article relevance degree between the selected first article and second article (which may be stored in the article data storage); extracting the second article whose article relevance degree with the first article satisfies a predetermined condition in relation to the first article; assigning a top priority to the first article; assigning a priority lower than the top priority of the first article to the extracted second article; and displaying the data concerning the first article and data concerning the extracted second article according to the assigned priorities of the first article and the extracted second article. Thus, articles data relevant to each other are extracted as, for example, ones constituting one topic, and the user can subscribe to the articles constituting the topic on a priority basis. Accordingly, the efficient management of articles and the efficient acquisition of articles by the user can be realized.

In addition, the article reader program may further comprise: acquiring from a site and storing the data concerning the first article and the data concerning the second article, which include folder information concerning a first folder corresponding to the site into an article database; displaying the first folder on a folder display part of a window; in response to a selection of the first folder by the user, filtering data stored in the article database based on the folder information concerning the selected first folder to acquire and store the data concerning the first article and the data concerning the second article into a spool; and displaying a list of the data concerning the first article and the data concerning the second article, which are stored in the spool, on an article list display part of the window. Furthermore, the display of the data concerning the first article may be instructed by a selection of the first article or a selection of the first folder.

Besides, the assigning the priority lower than the top priority of the first article to the extracted second article may comprise grouping the first and second articles as a topic, and the article reader program according to the invention may further comprise: detecting that deletion of a topic is selected by the user; and deleting data of the articles grouped as the topic selected by the user. Thus, data of plural relevant articles is managed as the topic, and when the user feels that it is unnecessary to read articles relating to a certain topic, an instruction relating to the topic deletion is issued, so that the article data relating to the topic is collectively deleted. Accordingly, the user can effectively acquire articles relating to another topic.

Besides, the article reader program may further comprise: storing data of a topic including one or a plurality of articles to which same topic information is assigned, into a topic database; acquiring third article data from a article providing site; calculating a topic relevance degree between the third article data and one or a plurality of topics whose data is stored in said topic database; and assigning topic information of a topic whose topic relevance degree with the third article data satisfies a second predetermined condition to the third article, and storing the third article with the assigned topic information. Besides, in a case where the operation mode is shifted to a sleep mode, for example, in a case where an operation from the user is not carried out for a fixed time, or in a case where a program window is minimized, the above steps may be executed.

Moreover, the article reader program may further comprise: acquiring article data stored in the topic database in response to detection of a predetermined instruction from the user (for example, in response to resume from the sleep mode, for example by an operation instruction to return the minimized screen to the original, an operation instruction to open the whole article relating to a selected article summary, and the like); and displaying the acquired article data for each topic based on the topic information assigned to the acquired article data. Thus, the user can subscribe to the article for each topic. Accordingly, the user can efficiently acquire the article. Incidentally, when the topic is displayed, reference may be made to a previously stored date and time when the operation mode is shifted to the sleep mode (for example, reference may be made to a predetermined area of the topic database), and based on the date and time, article data acquired from sites in the sleep mode may be treated as newly-arrived articles, article data already stored in the topic database before the date and time may be treated as relevant articles, and the newly-arrived articles and the relevant articles may be separately displayed.

The program of the invention is stored in a storage medium or a storage device such as, for example, a flexible disk, a CD-ROM, a magneto-optical disk, a semiconductor memory, or a hard disk. Besides, there is also a case where the program is distributed as digital signals through a network. Incidentally, intermediate processing data is temporarily stored in a storage device such as a memory of a computer.

BRIEF DESCRIPTION OF THE DRAWINGS

FIG. 3A is a diagram showing a data structure of an RSS document, and FIG. 3B is a diagram showing article elements of the RSS document;

FIGS. 14A to 14C are diagrams showing a structure of a topic database;

FIGS. 23A to 23C are diagrams showing a state of extraction of relevant article summaries;

DETAILED DESCRIPTION OF THE PREFERRED EMBODIMENTS

First Embodiment of the Invention

Figure 1:
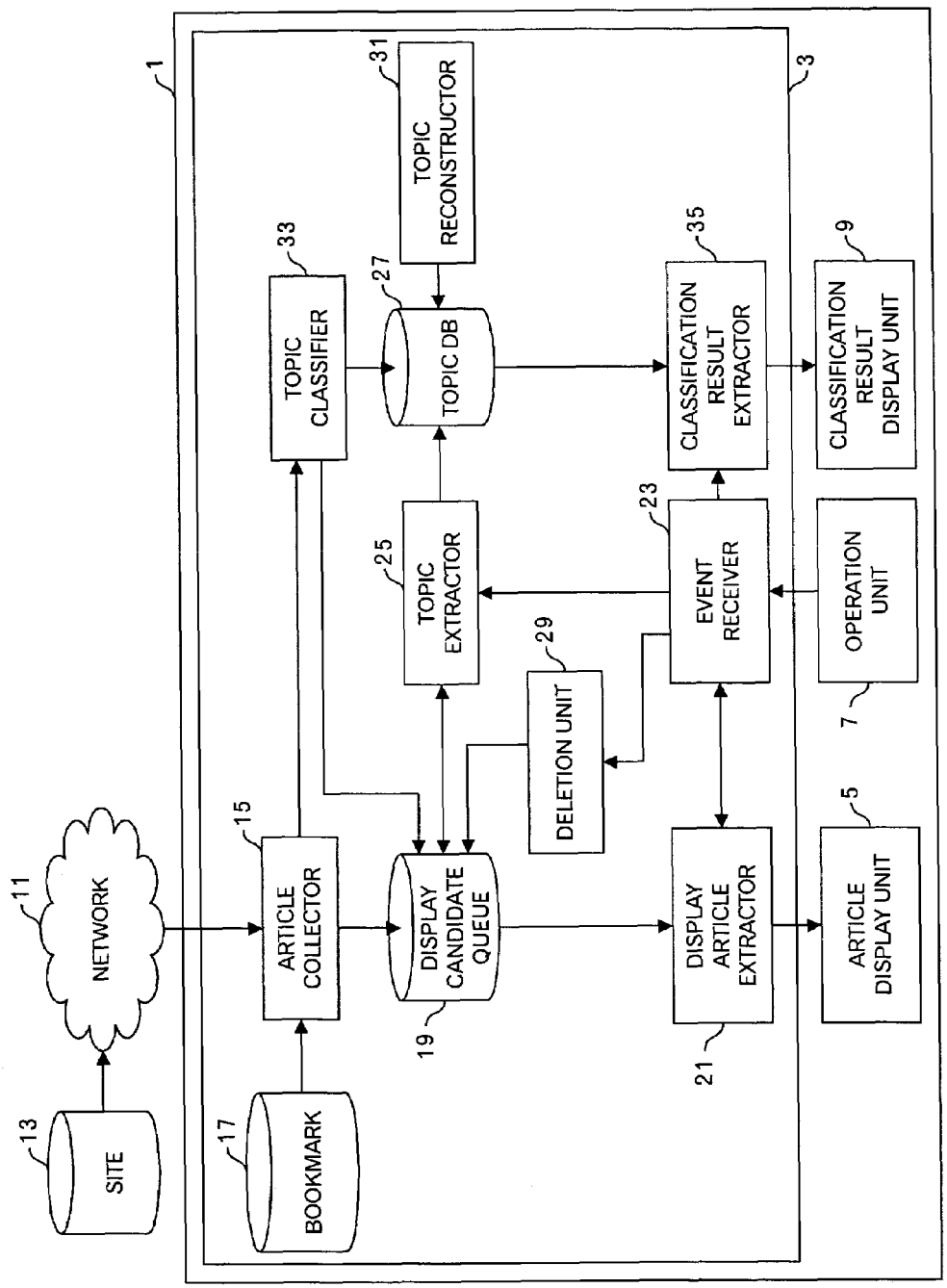
FIG. 1 is a functional block diagram showing the outline of a first embodiment of the invention.

The outline of a first embodiment of the invention will be described with reference to FIGS. 1 to 4. A computer 1 in the first embodiment of the invention is an apparatus to execute a ticker type RSS reader program 3, and further includes an article display unit 5, an operation unit 7, and a classification result display unit 9 as an input and output interface. The computer 1 is connected to article providing sites 13 through a network 11 such as, for example, the Internet. The RSS reader program 3 executed by the computer 1 is the program of acquiring data called an RSS document from the article providing site 13, managing article summaries included therein, and integrating one or plural article summaries into one group as the need arises. That is, the RSS reader program 3 carries out grouping of one or plural article summaries into one set and manages them. The RSS reader program 3 includes an article collector 15, a bookmark 17, a display candidate queue 19, which is, for example, a FIFO, a display article extractor 21, an event receiver 23, a topic extractor 25, a topic database 27, a deletion unit 29, a topic reconstructor 31, a topic classifier 33, and a classification result extractor 35.

Figure 2:
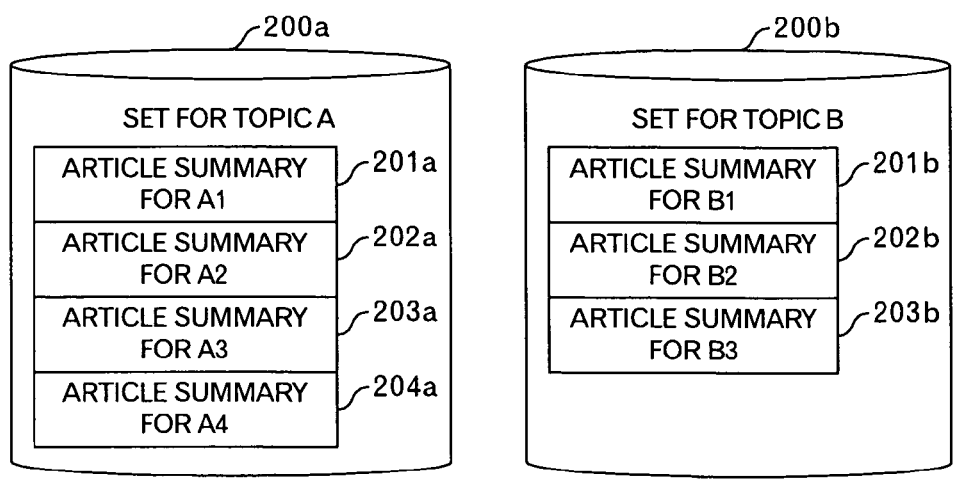
FIG. 2 is a diagram showing a relationship between an article summary and a topic set.

Here, "grouping" means constructing one set by plural article summaries relevant to each other or by only one article summary. In the first embodiment of the invention, such a set is called a "topic set". FIG. 2 shows a relationship between article summaries and a topic set. In FIG. 2, 200a denotes a topic set concerning a topic "A", and includes an article summary 201a concerning a topic "a1", an article summary 202a concerning a topic "a2", an article summary 203a concerning a topic "a3", and an article summary 204a concerning a topic "a4".

When the topic set 200a is the set of article summaries relating to the topic "Christmas", the topic set 200a can include:

the article summary 201a=article summary concerning "USB Christmas tree, on sale also this year", the article summary 202a=article summary concerning "nightmare, before Christmas", the article summary 203a=article summary concerning "Christmas sales battle does not warm up", and the article summary 204a=article summary concerning "where does Santa Claus comes from?".

Besides, the topic set 200b is similar to the topic set 200a, and when the topic set 200b is the set of article summaries concerning the topic "desktop retrieval", the topic set 200b can include:

an article summary 201b=article summary concerning "Ask Jeeves opens a beta edition to the public", an article summary 202b=article summary concerning "M*S search desktop retrieval is . . . ", and an article summary 203b=article summary concerning "Go**le is the first to arrive desktop retrieval".

The RSS reader program 3 gives specific data to the article summaries 201a to 204a, and 201b to 203b in order to differentiate the article summaries 201a to 204a, and 201b to 203b as the grouped topic sets from other article summaries, and in order to efficiently manage these article summaries. One of the specific data is called a "marker" described later, and another is called a "topic element". For example, the data concerning "Christmas" is included in the article summaries 201a to 204a, and in addition to this, the topic element relating to the topic "Christmas" is given to the article summaries 201a to 204a. Similarly, the data concerning "desk top retrieval" is included in the article summaries 201b to 203b, and in addition to this, the topic element relating to the topic "desktop retrieval" is given to the article summaries 201b to 203b.

Here, the structure of an RSS document and elements included in the RSS document will be described with reference to FIGS. 3A and 3B. As roughly shown in FIG. 3A, an RSS document 300 acquired from the article providing site 13 is written in XML (extensible Markup Language) format. In the XML, various data can be written by using a pair of tags of a start tag < . . . > and an end tag </ . . . >. In the RSS, as illustrated in FIG. 3A, an <item/> tag, a <title/> tag, a <link/> tag, a <description/> tag, a <content: encoded/> tag, a <dc:subject/> tag, a <dc:creator/> tag, and a <dc:date/> tag are described in the RSS document 300. These tags are tags generally used in the RSS.

Besides, in the RSS document 300, for example, the content "XYZ news publishing company" of an element is described to be interposed between a pair of the <dc:creator> tag and the </dc:creator> tag.

FIG. 3B shows the classification of an example of elements in the RSS document in use. However, in FIG. 3B, only kinds of tags are illustrated. The elements of the RSS document 300 acquired from the article providing site 13 are roughly classified into two kinds of article elements. One includes a link element 301a (i.e. <link/> tag) and an update date element 301b (i.e. <dc:date/> tag), and the RSS reader program 3 can uniquely specify the RSS document by using these as a compound key 301. The other includes one called "article extraction element" or "article extraction tag" for convenience, and the <item/> tag, the <title/> tag and the like shown in FIG. 3A are classified into the article extraction element. Tags classified as the article extraction tag 303 are tags other than the <link/> tag, the <dc:date/> tag, and a <topic/> tag described below.

On the other hand, a topic element 305 (<topic/> tag) is an element given to, when the RSS documents are grouped, the grouped RSS documents. That is, the RSS reader program 3 recognizes, as one of RSS documents constituting a topic set, an RSS document 307 in which the topic element 305 is further given to the RSS document 300 including only the two kinds of the article elements 301 and 303. Incidentally, in the RSS reader program 3, in the case where the RSS document 300 is managed as the XML file, the topic element 305 may be described in a predetermined area of the XML file. Besides, in the case where the RSS document 300 is managed as a list or a relational database, data relating to the topic element may be stored in a specific area of a record corresponding to the RSS document, for example, data "Christmas" or "desktop retrieval" may be stored on an area of "topic column".

With reference to FIG. 1 again, the article collector 15 refers to the bookmark 17, acquires RSS documents from the article providing sites 13, and sequentially stores article summaries of the acquired RSS documents into the display candidate queue 19. Data relating to link destinations previously registered by the user, for example, the URLs of the article providing sites 13 are stored in the bookmark 17 in advance. The article collector 15 patrols (i.e. polls) the article providing sites 13 based on the link destination data, and downloads the RSS documents of the sites as a newly-arrived article. The patrol of the sites is periodically carried out. In the case where the operation mode of the RSS reader program 3 is a sleep mode, the article collector 15 does not store the article summary relating to the acquired RSS document into the display candidate queue 19, but delivers it to the topic classifier 33.

The display article extractor 21 acquires the article summary stored at the head of the display candidate queue 19 according to an instruction from the event receiver 23 described later. The acquired article summary is displayed on the article display unit 5 of the computer 1.

The event receiver 23 receives an event, judges the received event, and instructs the respective processing units to execute processing. Such an event includes a user event generated as a result that the user uses the operation unit 7 (i.e. input interface such as a mouse or a keyboard) to instruct the RSS reader program 3. Besides, there is also an event generated by the event receiver 23 itself, and for example, there are a first timer event generated to periodically update (i.e. refresh) the content displayed on the article display unit 5, and a second timer event generated by detecting that an operation from the user has not been performed for a fixed time. The event receiver 23 includes a timer to manage the timer events as stated above. Besides, when it instructs the processing execution, data relating to the article document being displayed on the article display unit 5 (i.e. displayed article summary), that is, the article summary at the head is acquired from the display article extractor 21 as the need arises.

When the processing execution instruction in which the head article summary is specified is notified through the event receiver 23, the topic extractor 25 extracts article summaries relating to the head article summary from the article summaries stored in the display candidate queue 19. The extracted article summaries, together with the head article summary, are grouped. The grouped article summaries are registered in the topic database 27, and are also stored in the display candidate queue 19, so that the grouped article summaries are sequentially displayed on the article display unit 5 in order from the head article summary.

When receiving the notification of the delete instruction (which is an instruction from the operation unit 7) event from the user through the event receiver 23, or the instruction of the processing relating to the aforementioned first timer event, the deletion unit 29 deletes the article summary from the display candidate queue 19. The deletion of the article summary includes two modes. One is an article summary delete mode, and the other is a topic delete mode. In the case of the article summary delete mode, one RSS document is deleted, and in the case of the topic deletion, the grouped article summaries relating to the topic set are collectively deleted.

The RSS reader program 3 has a function to switch the operation mode from the normal mode to the sleep mode in the case where the event receiver 23 detects that for example, an operation from the user has not been carried out for a fixed time, or the program window of the RSS reader program 3 is minimized. When the RSS reader program 3 shifts to the sleep mode, the article collector 15 temporarily stops the site patrol. At the time of the shift to the sleep mode, the topic reconstructor 31 reconstructs the topic sets stored in the topic database 27. When the reconstruction of the topic sets is ended, the article collector 15 resumes the site patrol. However, the article summary relating to the RSS document acquired in the sleep mode is not stored in the display candidate queue 19, but is delivered to the topic classifier 33.

The topic classifier 33 judges whether the acquired article summary can be classified into one of topic sets stored in the topic database 27. In the case where it can be classified, the topic classifier 33 gives the topic element relating to the topic set of the classification destination to the article summary, and registers the article summary to which the topic element is given into the topic database 27. The article summary is also stored in the display candidate queue 19. In the case where the article summary cannot be classified, it is stored neither in the topic database 27 nor in the display candidate queue 19, and the article summary is discarded. Incidentally, a method is conceivable in which in the case where the classification cannot be performed, the article summary acquired from the article providing site 13 is not discarded, and a new topic set concerning the article summary is defined.

In the case where the event receiver 23 detects the event relating to a predetermined operation from the user, for example, in the case where it detects the event relating to the instruction of article display from the user, or in the case where it detects the event to return the program window minimized by the user instruction to the original size, the RSS reader program 3 in the sleep mode switches the operation mode to the normal mode. At this time, the operation of the article collector 15 is switched to the operation of the normal mode. Moreover, when receiving the instruction of the processing execution from the event receiver 23, the classification result extractor 35 acquires all of the article summaries stored in the topic database 27, arranges the article summaries for each topic according to the topic elements given to the article summaries, and displays the arrangement results on the classification result display unit 9. In the arrangement of the article summaries, it is preferable to display them in each topic and for each newly-arrived article and each relevant article.

Figure 4:
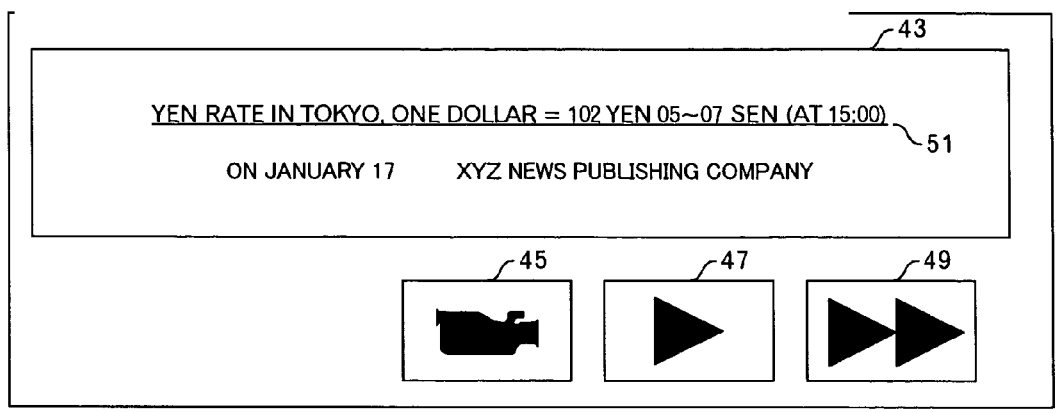
FIG. 4 is a diagram illustrating a program window of a ticker type RSS reader.

A program window 41 of the RSS reader program 3 will be described with reference to FIG. 4. The program window 41 includes an article summary display unit 43 and three buttons 45, 47 and 49. The article summary display unit 43 is an area for displaying partial or all elements of the article summary relating to the RSS document acquired from the display candidate queue 19, more particularly the content interposed between the start tag and the end tag. FIG. 4 shows an example in which a display is carried out using the contents of the <title/> element, the <dc:creator/> element, and the <dc:date/> element in the RSS document 300 shown in FIG. 3A.

The content of the <title/> element "yen rate in Tokyo, one dollar=102 Yen 05 to 07 Sen (at 15:00)" is a hyperlink 51 whose link destination is the content of the <link/> element. When the user selects this hyperlink 51, for example, clicks it by a mouse, the RSS reader program 3 activates a Web browser. The Web browser acquires the whole article relating to the article summary being displayed from the link destination, and displays it. In addition to the activation of the Web browser, the RSS reader program 3 executes a series of topic extraction processings by the topic extractor 25. The button 45 provides a function comparable to the hyperlink 51, and when the user clicks the button 45, the Web browser is activated, and the series of topic extraction processings are executed.

In the article summary display unit 43 for the conventional ticker type RSS reader, article summaries stored in the display candidate queue 19 are automatically and sequentially displayed at predetermined time intervals. Thus, the user can read articles only in fixed order of display provided by the ticker type RSS reader. The button 47 in the program window 41 shown in FIG. 4 is a user interface to delete only one article summary being displayed presently and to display a next article summary. The button 49 is a user interface to delete not only the data of the article summary being displayed presently but also the data of article summaries relevant to the article summary being displayed, and to display an article summary subsequent to the deleted article summary group.

[Description of Detailed Operation]

Hereinafter, the detailed operation of the RSS reader program 3 will be described with reference to FIGS. 5 to 16. Here, the description will be made in order of (1) in normal mode, (2) in sleep mode, and (3) in return to normal mode.

(1) Operation in Normal Mode

Figure 5:
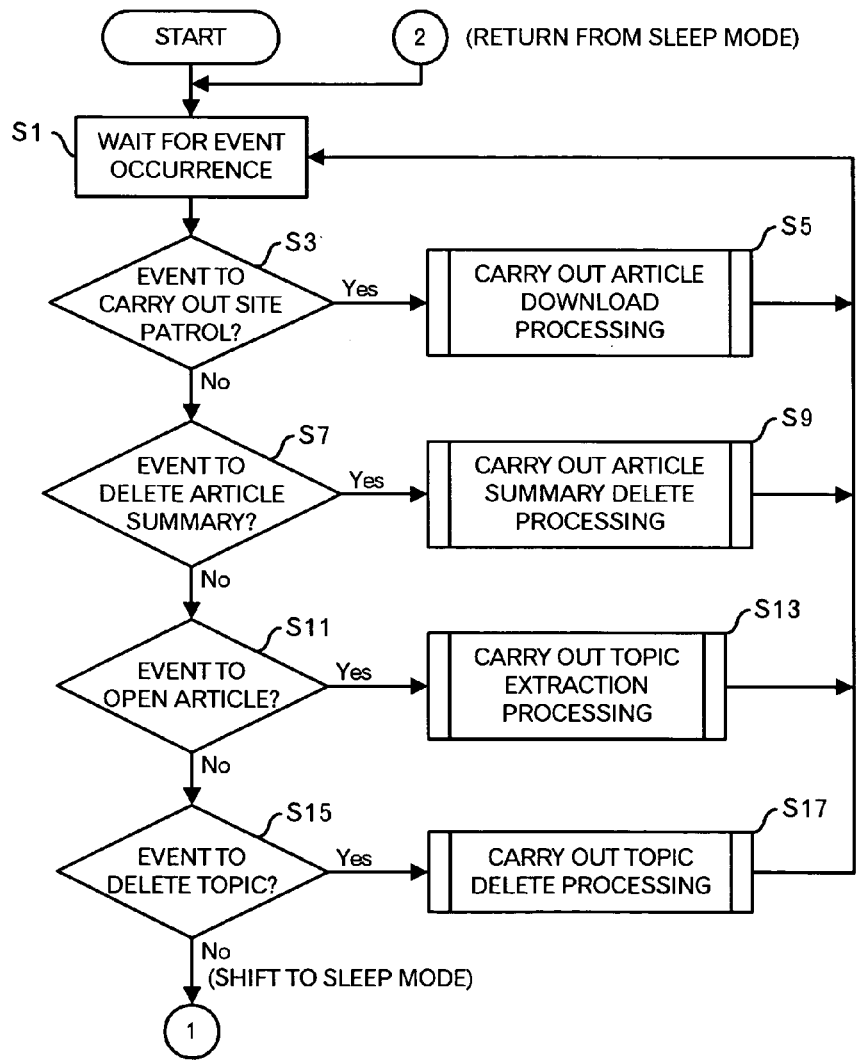
FIG. 5 is a diagram showing a basic operation processing of a program in a normal mode.

As shown in FIG. 5, the event receiver 23 of the RSS reader program 3 watches and waits for the occurrence of an event concerning the operation instruction from the operation unit 7 by the user, or the occurrence of an event concerning the processing instruction from the event receiver 23 itself (step S1). When the event occurs, the event receiver 23 judges the content of the occurring event, and instructs, according to the content, the respective processing units in the RSS reader program 3 to execute processings. The processings to be executed by the respective processing units having received the processing execution instruction are processings described below in (a) to (e).

(a) In the case where the occurring event is the event relating to "site patrol" (step S3: Yes route), the article collector 15 executes an "article download processing" (step S5). When the article download processing is ended, the event receiver 23 watches and waits for the occurrence of an event (step S1).

(b) In the case where the occurring event is the event relating to "deletion of article summary" (step S7: Yes route), the deletion unit 29 executes an "article summary delete processing" (step S9). When the article summary delete processing is ended, the event receiver 23 watches and waits for the occurrence of an event (step S1).

(c) In the case where the occurring event is the event relating to "opening of article" or "display of article" (step S11: Yes route), the topic extractor 25 executes a "topic extraction processing" (step S13). When the topic extraction processing is ended, the event receiver 23 watches and waits for the occurrence of an event (step S1).

(d) The occurring event is the event relating to "deletion of topic" (step S15: Yes route), the deletion unit 29 executes a "topic delete processing" (step S17). When the topic delete processing is ended, the event receiver 23 watches and waits for the occurrence of an event (step S1).

(e) In the case where an event other than the above occurs (step S15: No route), the procedure proceeds to the processing in the sleep mode shown in FIG. 11 through a terminal 1.

(a) Article Download Processing

The article download processing by the article collector 15 is executed when the event receiver 23 detects the event relating to "site patrol" and notifies a processing execution instruction of the "site patrol" to the article collector 15. Here, in the ticker type RSS reader, it is desirable that the event concerning the "site patrol" is a timer event on account of its user interface. Specifically, the event is for causing the event receiver 23 to instruct the article collector 15 to carry out the patrol of predetermined sites.

Figure 6:
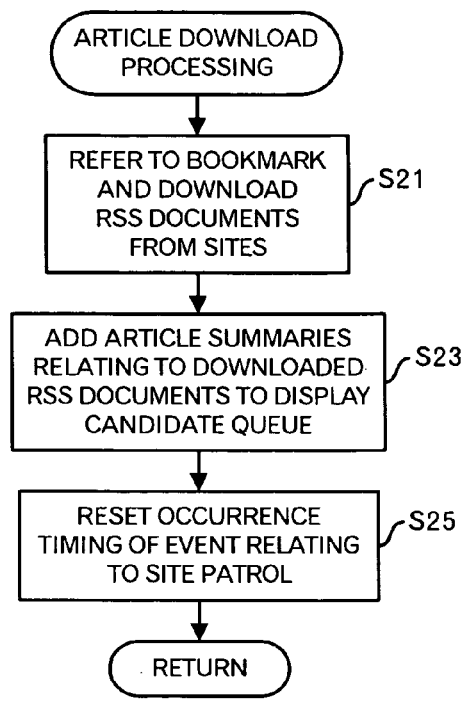
FIG. 6 is a diagram showing an article download processing.
Figures 10A, 10B:
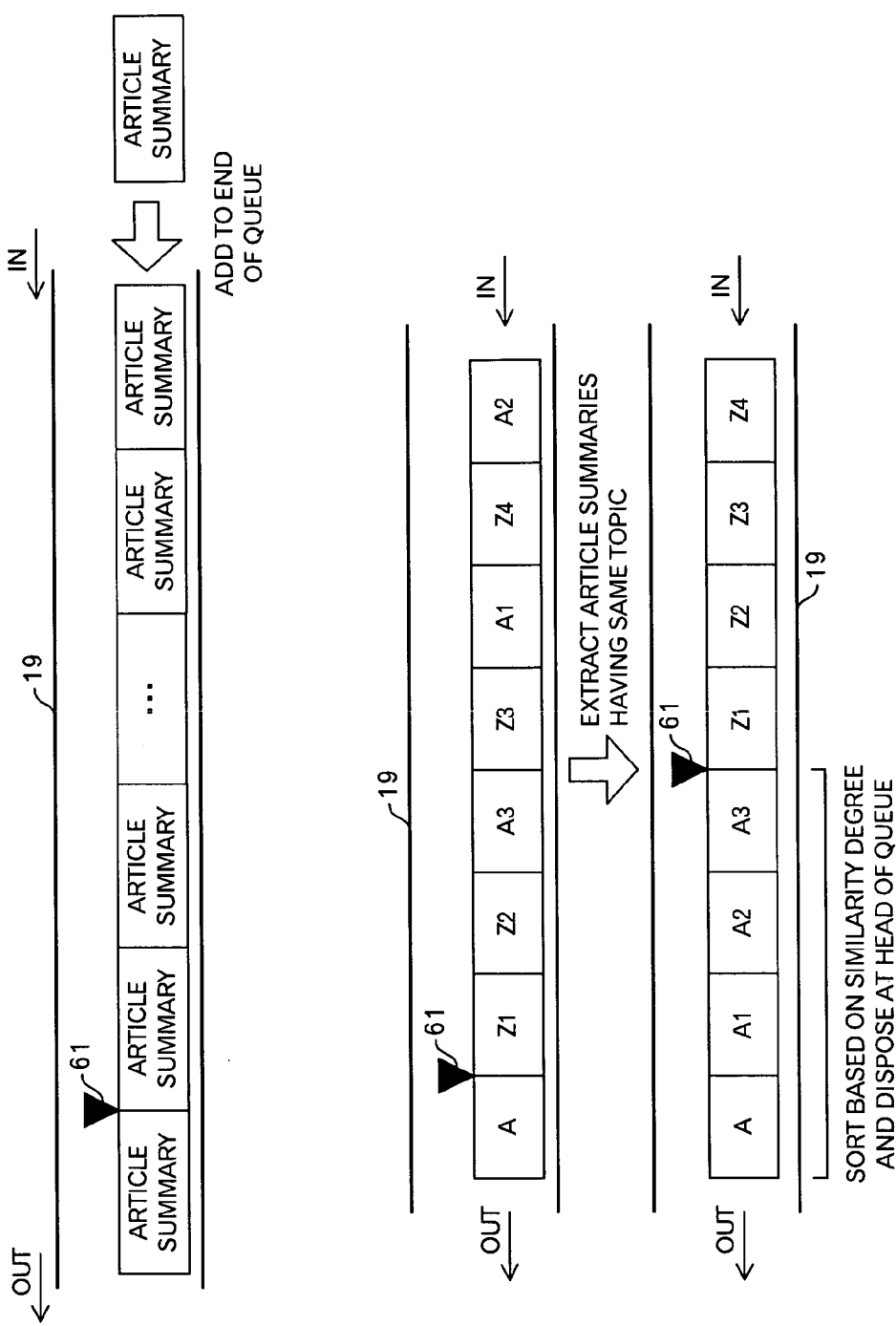
FIGS. 10A to 10C are diagrams showing a structure of a display candidate queue.

FIG. 6 shows the details of the article download processing. In response to a site patrol alarm from the event receiver 23, the article collector 15 acquires a URL from the bookmark 17, downloads a RSS document from the article providing site 13 based on the acquired URL (step S21), and adds data of the article summary relating to the downloaded RSS document to the end of the display candidate queue 19 (step S23). In the case where the number of the article providing sites 13 to be patrolled is plural, the steps S21 and S23 are repeated, and the article summaries relating to the RSS documents acquired from the sites are sequentially added to the display candidate queue 19. When the download processing of the RSS document from the article providing site 13 and the addition processing of the article summaries relating to the RSS documents to the queue are ended, the event receiver 23 resets the occurrence timing of an event relating to the site patrol (step S25). Incidentally, as for the resetting processing, the article collector 15 may execute the resetting processing, and the result of the resetting processing may be notified to the event receiver 23. FIG. 10A shows a state in which the article summary relating to the RSS document acquired from the article providing site 13 is added to the end of the display candidate queue 19.

(b) Article Summary Delete Processing

The article summary delete processing by the deletion unit 29 is executed when the event receiver 23 detects the event relating to "deletion of the article summary" and notifies a processing execution instruction of the article summary deletion to the deletion unit 29. Here, the event relating to the "deletion of the article summary" includes two events. One is an event by a user instruction, for example, an event generated when the user clicks the button 47 as described in the explanation of FIG. 4. The other is a kind of timer event generated by the event receiver 23 itself, and is an event generated to periodically update the content displayed on the article display unit 5.

Figure 7:
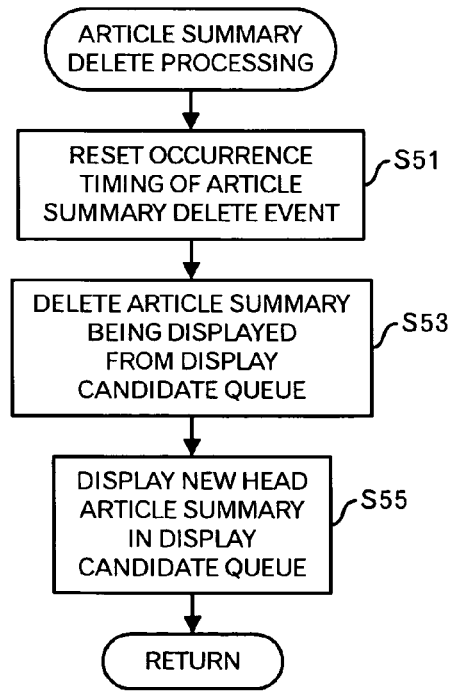
FIG. 7 is a diagram showing an article summary delete processing.

FIG. 7 shows the details of the article summary delete processing. In response to the event relating to the article summary deletion from the event receiver 23, the deletion unit 29 first resets the occurrence timing of the event relating to the article summary deletion, and notifies the result of the resetting processing to the event receiver 23 (step S51). Incidentally, as for the resetting processing, the resetting processing may be executed by the event receiver 23 before it notifies the event relating to the article summary deletion to the deletion unit 29. Next, the deletion unit 29 deletes the article summary displayed on the article display unit 5 (that is, the article summary being displayed) from the display candidate queue 19 (step S53). When the deletion of the article summary is ended, the deletion unit 29 notifies the delete completion to the event receiver 23, and the event receiver 23 having received the notification of the delete completion notifies the processing execution instruction to the display article extractor 21. In response to the processing execution instruction from the event receiver 23, the display article extractor 21 acquires a new head article summary from the display candidate queue 19, and displays it on the article display unit 5 (step S55).

Incidentally, as for the deletion of the article summary at the step S53, instead of deleting the data itself from the display candidate queue 19, the deletion unit 29 may store the article summary at the end of the display candidate queue 19. Besides, when the discard of the article summary is completed, instead of notifying the delete completion to the event receiver 23, the deletion unit 29 may notify the processing execution instruction to the display article extractor 21.

(c) Topic Extraction Processing

The topic extraction processing by the topic extractor 25 is executed when the event receiver 23 detects the event relating to "opening of article" or "display of article" and notifies a processing execution instruction to the topic extractor 25. Here, the event relating to "opening of article" or "display of article" is, for example, an event generated when the user clicks the hyperlink 51 or the button 45 as described in the explanation of FIG. 4. When issuing the processing execution instruction to the topic extractor 25, the event receiver 23 acquires data relating to the article summary displayed on the article display unit 5, that is, data of the article summary being displayed from the display article extractor 21, and transmits the data of the article summary being displayed to the topic extractor 25.

Figure 8:
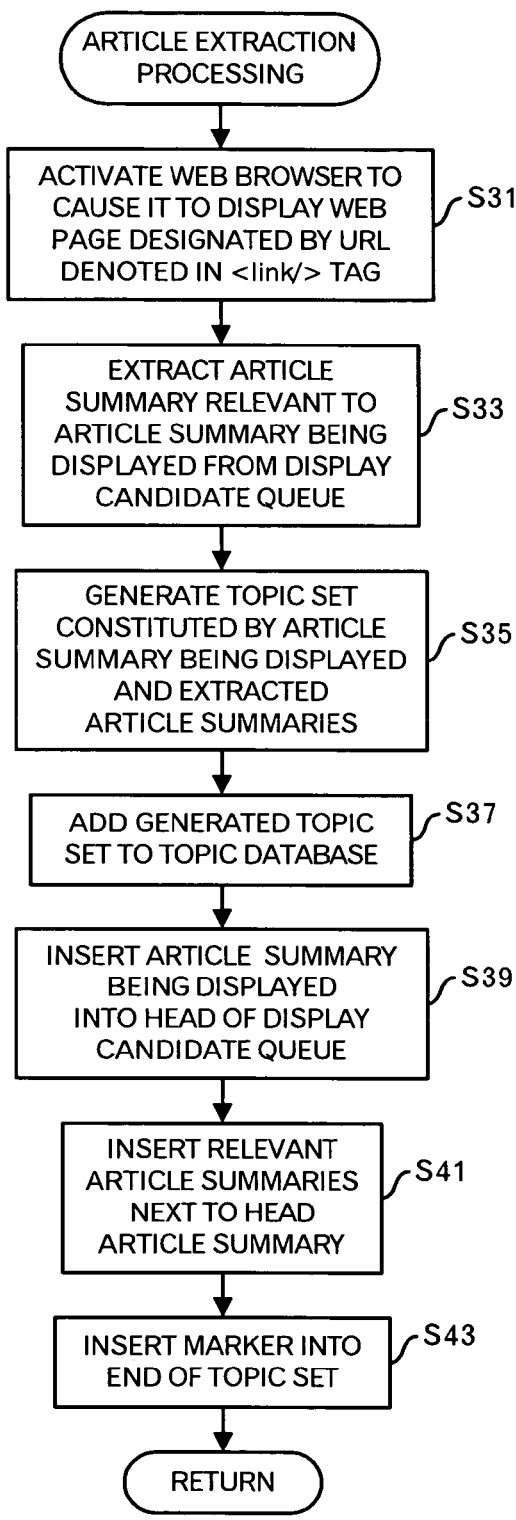
FIG. 8 is a diagram showing a topic extraction processing.

FIG. 8 shows the details of the topic extraction processing. The topic extractor 25 activates the Web browser. At that time, a URL described in the <link/> tag of the article summary transmitted from the event receiver 23 and being displayed is given to the Web browser (step S31). The Web browser accesses the URL, acquires the whole article document concerning the article summary being displayed and displays the article document.

In addition to the activation of the Web browser, the topic extractor 25 executes the processing at steps S33 to S43 described below. First, the topic extractor 25 extracts an article summary relating to an article summary being displayed from the display candidate queue 19 (step S33).

Here, the details of the processing at the step S33 will be described. The article summary being displayed is denoted as x, the display candidate queue 19 is denoted as Y, an article summary stored in Y and other than x is denoted as y, and a topic set T is defined by a following expression (1) while using a similarity degree function Sx(y) to calculate the similarity degree between the article summaries x and y.

$$T=\{x\}\cup\{y|Sx(y)\geq\tau, y\in Y\} \quad (1)$$

Where, τ denotes a previously determined similarity degree threshold. According to the expression (1), the set of the article summary x being displayed and the article summary group in which the similarity degree Sx(y) is the predetermined similarity degree threshold τ or more is defined as the topic set. At the step S33, numerical calculation of the similarity degree function as stated above is executed, and the degree of similarity of the article summaries is judged. Although the similarity degree function Sx(y) can be defined in various forms, two examples will be described here.

EXAMPLE 1

Similarity Degree Function by Article Attribute Value

The article summary includes article elements such as a title, a URL, an update date, and an author, and as shown in FIG. 3B, these article elements belong to one of the compound key 301 and the article extraction element 303. These article elements are for expressing the feature of the article relating to the article summary. Then, with respect to two article summaries x and y, the similarity degree (i.e. partial similarity degree) with respect to the same article element is calculated, and after the partial similarity degree is multiplied by a predetermined weight, the total sum of the weighted partial similarity degrees with respect to all article elements is calculated. The value calculated in this way is defined as the similarity degree between the article summaries x and y. This is expressed by a following expression (2).

$$Sx(y)=\Sigma\{wi\times\delta i(x, y)\} \quad (2)$$

Where, wi denotes the weight of the article element i, and δi (x, y) denotes the function to calculate the partial similarity degree between the article summary x and the article summary y with respect to the article element i. With respect to the function δi, the function suitable for each article element i is selected. For example, in the case where the article element i is the title (<title/> element), the function to calculate the partial similarity degree by identity and difference of partial character strings of the article summaries x and y is selected. In the case where the article element i is the update date (<dc:date/> element), the function to calculate the partial similarity degree by an interval between the update dates of the article summaries x and y is selected. Besides, with respect to one in which data for the article element of the article summary can be long sentence data, for example, a summary (<description/> element) a method is general in which some keywords are extracted by morphological analysis, the importance of each of the extracted keywords is calculated as a TF-IDF (Term Frequency-Inverse Document Frequency) value, each of the article summaries x and y is converted into a vector expression based on the calculated TF-IDF values, and the inner produce of the vectors is calculated as the similarity degree.

EXAMPLE 2

Similarity Degree Function Based on Link Reference

When the article body is downloaded from the URL included in the <link/> tag of the article summary, a hyperlink to refer to another document is often included in the downloaded article body. Then, a similarity degree function using a hyperlink is defined by a following expression (3).

$$Sx(y)=\{\lambda |L(\{x\}) \cap L(\{y\})|-|L(\{x\})|\}/\{(\lambda-1)|L(\{x\})|\} \quad (3)$$

Where, $\{x\}$ denotes a hyperlink set in which one hyperlink as the <Link/> tag value of the article summary x is made an element. L denotes a mapping from a hyperlink set to a hyperlink set, and L(X) denotes a set of hyperlinks included in the Web page designated by each element of the hyperlink set X. That is, $L(\{x\})$ is obtained by reading out all hyperlinks included in the article body of the article summary x. Besides, |L| denotes the number of elements of the set L (that is, the number of hyperlinks) and $\lambda$ denotes a predetermined coefficient ($\lambda>1$). According to the expression (3), in the case of $\lambda=2$, when the article body corresponding to the article summary x and the article body corresponding to the article summary y do not have a common hyper link, the similarity degree becomes $-1$. Besides, when the hyperlink set of the article body corresponding to the article summary y is completely coincident with the hyperlink set of the article body corresponding to the article summary x, the similarity degree becomes 1. As for the Weblog, it is generally carried out that an article document is written while another Web page is cited by using the hyperlink. Thus, it is expected that such definition of the similarity degree function is useful for the judgment of the similarity degree between article summaries.

Here, in the example 1, the similarity degree is calculated by the article summary, whereas in the example 2, the similarity degree is calculated based on links included in the article body corresponding to the article summary. Thus, in the example 2, the processing steps S31 and S33 of FIG. 8 become, for example, a procedure described below.

(Procedure in the Case of Example 2)

The topic extractor 25 activates the Web browser in order to display the article body concerning the article summary being displayed, and causes the Web browser to access the URL described in the <link/> tag of the article summary. Besides, the topic extractor 25 reads out the URLs included in all article summaries stored in the display candidate queue 19, makes accesses to the URLs, and acquires and stores the corresponding article bodies into a storage device (step S31). Then, with respect to the acquired article bodies, the topic extractor 25 calculates the similarity degree described in the example 2, and extracts the article summary relevant to the article summary selected by the user (step S33).

Incidentally, in the example 2, it is possible to make the hyperlink set L(x) include hyperlinks in multiple layers. That is, a system may be adopted in which X2=L(X1), X3=L(X2), . . . in addition to X1=L({x}) are also considered for the calculation of the similarity degree based on the link reference. Specifically, a definition is made as follows:

$$L^{(i)}(X)=L(X)$$

$$L^{(n)}(X)=L(L^{n-1})(n \geq 1)$$

Further, a following definition is made:

$$\tilde{L}^{(n)}(X) = \bigcup_{i=1}^{n} L^{(i)}(X)$$

Then, a method using, in the expression (3), $$\tilde{L}^{(n)}(\{x\})$$

instead of $L(\{x\})$ can be used. In this case, it is desirable to deform the similarity degree function Sx (y) so that weighting by the hyperlink hierarchy of the hyperlink set $L(\{x\})$ included in the first article summary x and the hyperlink sets $L^{(2)}(\{x\})$, $L^{(3)}(\{x\})$, . . . included in the Web pages obtained by further tracing the links is reflected.

OTHER EXAMPLES

As another method, it is possible to adopt a method in which a cited portion by a partial copy from another Web page or article in an article body x is used as a key to identify a Web page or an article as the origin of the citation, and this is made to be included in L (x), or a method of handling a reference created by using a truck back function characteristic of the Weblog.

With reference to FIG. 8 again, the topic extractor 25 gives topic elements as described in the explanation of FIGS. 2 and 3 to the article summary being displayed and the relevant article summary extracted by the processing at the step S33, and generates the topic set with the article summary being displayed and the relevant article summary (step S35), and additionally registers the generated topic set in the topic database 27 (step S37). Further, the topic extractor 25 inserts the article summary being displayed to the head of the display candidate queue 19 (step S39), and inserts the relevant article summary next to the inserted head article summary (step S41). At this time, when the relevant RSS documents are sorted based on the relevance degree with the head RSS document, the user can continuously read the relevant article summaries. Then, the topic extractor 25 inserts a marker to the end of the inserted relevant article summaries (step S43).

By the topic extraction processing shown in FIG. 8, the movement of the article summary occurs in the inside of the display candidate queue 19. FIG. 10B shows a state of the movement in the queue. In the case where the user instructs to open the head article A in the display candidate queue 19, the topic extractor 25 extracts the article summaries relating to the head article summary A from the article summaries A, Z1, Z2, A3, Z3, A1, Z4 and A2 sequentially stored as shown in the upper stage of FIG. 10B. As a result of the extraction processing, in the case where it is judged that the article summary A1 is most similar to the head article summary A, and the article summaries A2 and A3 are next similar in this order, and it is judged that the other article summaries Z1, Z2, Z3 and Z4 are not similar, the topic extractor 25 disposes the head article summary A at the head of the display candidate queue 19, and next inserts the article summaries to the display candidate queue 19 in order of A1, A2 and A3.

As stated above, because the article summaries A1 to A3 are sorted based on the similarity degree, the order of arrangement of them is different from the original order of arrangement. On the other hand, the order of arrangement of Z1 to Z4 is the same as the original order. Then, in order to indicate that the article summaries A and A1 to A3 constitute a topic set, the topic extractor 25 inserts a marker 61 to a position immediately after the article summary A3. The marker 61 indicates the boundary between the article summary included in the topic set and another article summary, and in a topic delete processing, which will be mentioned later, a processing to delete the article summaries included in the topic set from the display candidate queue 19 is executed by using this marker 61.

(d) Topic Delete Processing

The deletion unit 29 performs not only the article delete processing described above but also the topic delete processing. The topic delete processing is executed when the event receiver 23 detects the event relating to "deletion of topic", and notifies a processing execution instruction of a topic delete alarm to the deletion unit 29. Here, the event relating to "deletion of topic" is the event generated in the case where the user clicks the button 49 as described in the explanation of FIG. 4. That is, when the user clicks the button 49, the topic delete processing is executed.

Figure 9:
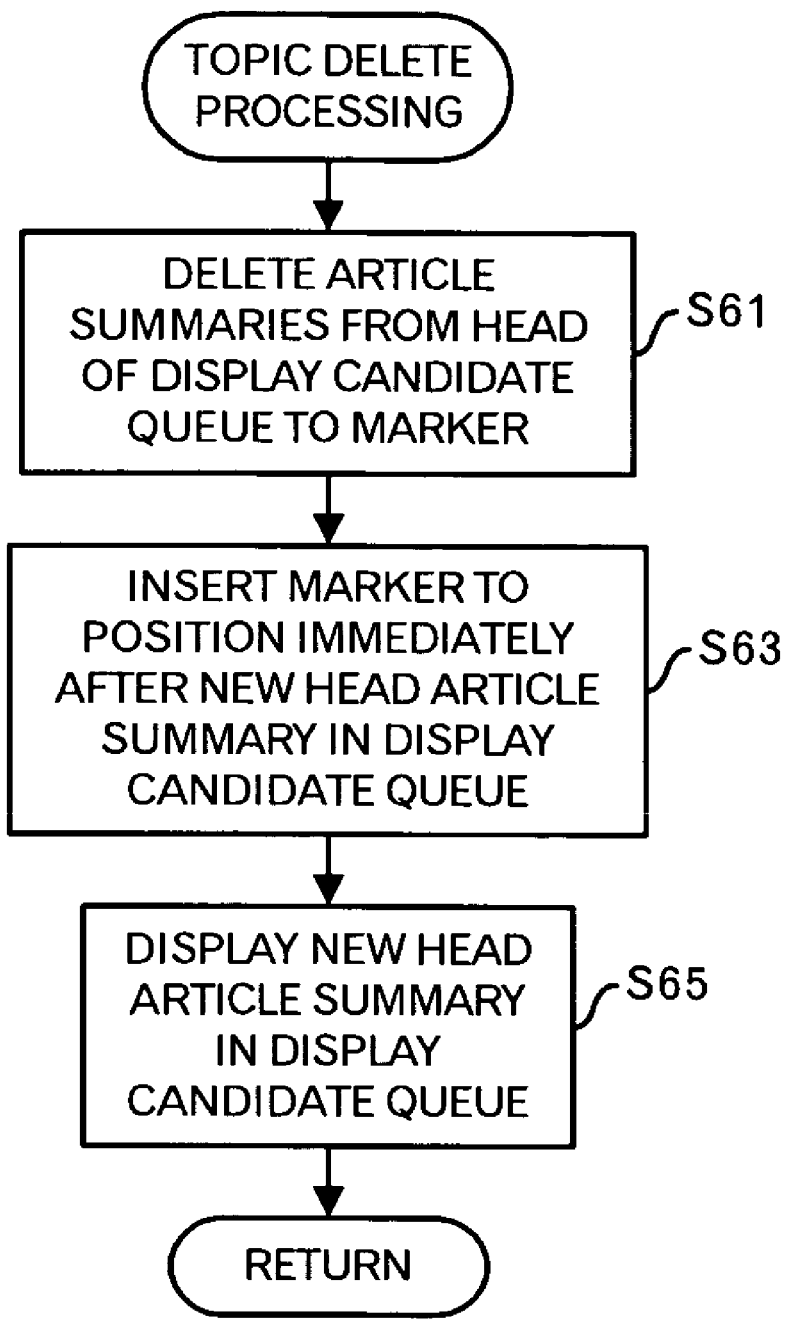
FIG. 9 is a diagram showing a topic delete processing.
Figure 10C:
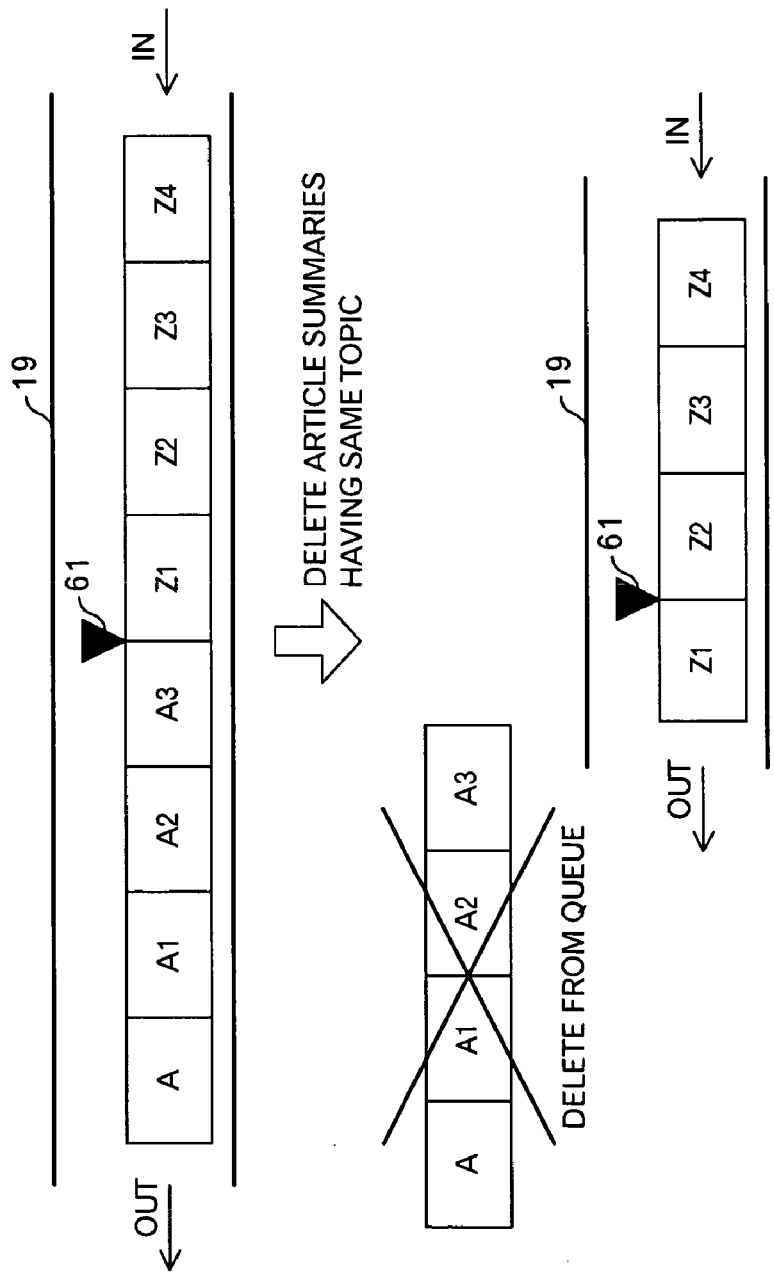

FIG. 9 shows the details of the topic delete processing. FIG. 10C shows a state of change in the display candidate queue 19 by the topic delete processing. In FIG. 9, in response to the event relating to the topic deletion from the event receiver 23, the deletion unit 29 collectively deletes the article summaries in a range from the head of the display candidate queue 19 to the position immediately before the marker (step S61). Next, the deletion unit 29 inserts a marker to a position immediately after the new head article summary of the display candidate queue 19 (step S63). FIG. 10C shows the state in which the article summaries A, A1, A2 and A3 are deleted. At the deletion of the topic, the deletion unit 29 confirms the position of the marker 61, and deletes the article summaries up to the article summary A3 immediately before the marker 61. By this deletion, the article summary X1 is disposed at the head of the queue. Further, FIG. 10C shows the state in which the marker 61 is inserted to the position immediately after the new head article summary Z1 of the display candidate queue 19. With reference to FIG. 9 again, the new head article summary is displayed on the article display unit 5 (step S65).

Incidentally, at the step S61, similarly to the article delete processing described above, the deletion unit 29 may reset the occurrence timing of the event relating to the article summary deletion as the need arises. Besides, in the deletion of the article summaries in the range from the head of the display candidate queue 19 to the position immediately before the marker 61, instead of deleting the data itself from the display candidate queue 19, the deletion unit 29 may store the series of article summaries at the end of the display candidate queue 19. At that time, the deletion unit 29 gives predetermined data, for example, an already-read flag to the series of article summaries, and after a predetermined time has passed, the article summaries to which the already-read flag is given may be deleted from the display candidate queue 19.

(e) Shift to the Sleep Mode

The processings described above in (a) to (d) are the details of the processing in the normal mode of the RSS reader program 3. In the case where the event receiver 23 receives an event other than the foregoing events (for example, in the case where a timer event is detected which is generated when an operation from the user has not been performed for a fixed time, or in the case where a user event is detected which is generated when the user gives an instruction of minimization of a window of the RSS reader program 3 by the operation unit 7) (step S15: No route), the procedure proceeds to the processing of the sleep mode shown in FIG. 11 through the terminal 1.

(2) Operation in the Sleep Mode

Figure 11:
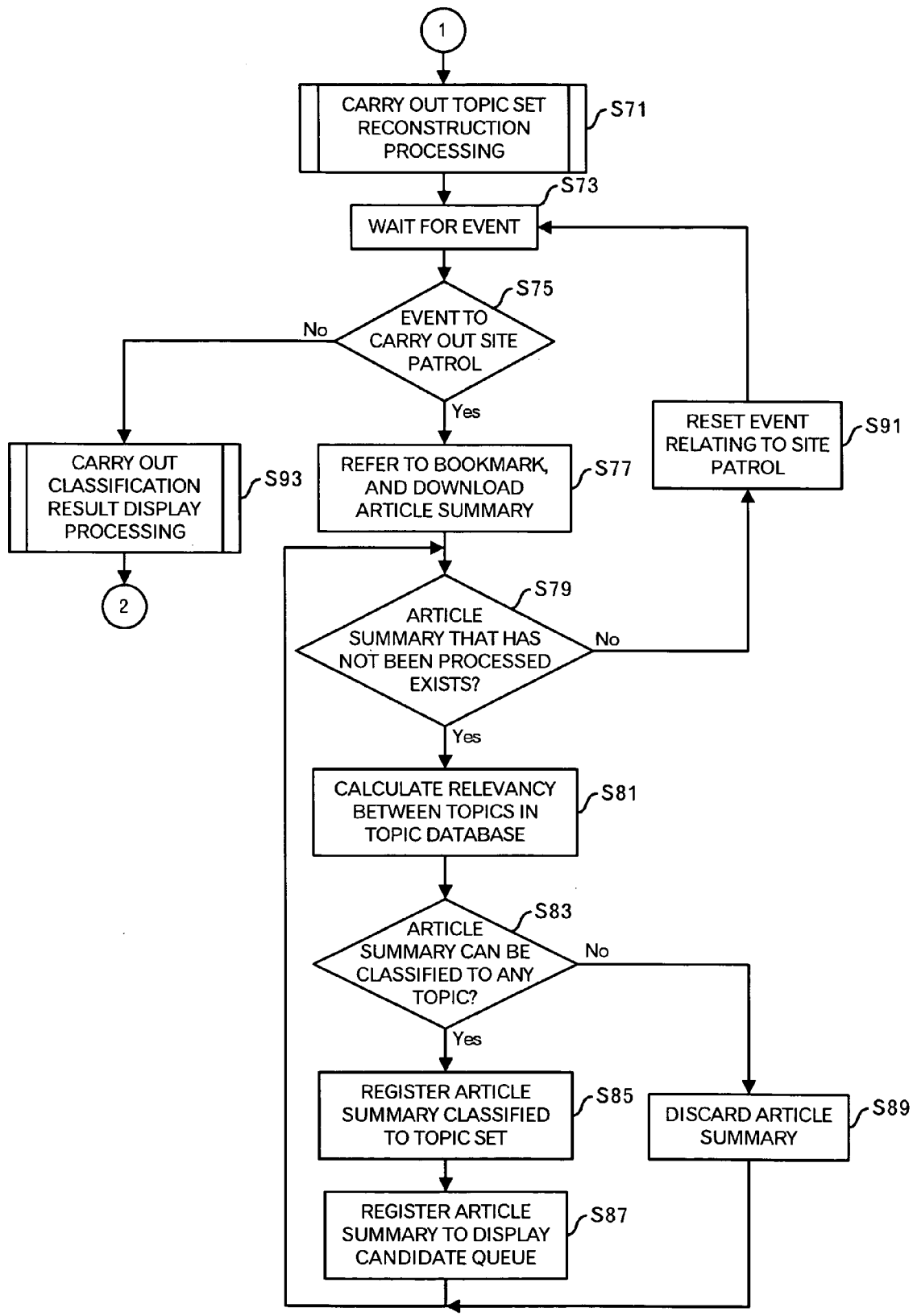
FIG. 11 is a diagram showing a basic operation processing of a program in a sleep mode.

FIG. 11 shows the basic flow of the operation of the RSS reader program 3 in the sleep mode. First, the RSS reader program 3 carries out the switching of the operation mode. In detail, the event receiver 23 notifies the article collector 15 that the operation mode is switched to the sleep mode. In response to the notification, the article collector 15 temporarily stops the patrol processing of sites, that is, the acquisition processing of RSS documents. Further, when the temporarily stopped processing is resumed, the operation is switched so that the article summary relating to the acquired RSS document is not stored in the display candidate queue 19, but is delivered to the topic classifier 33. Next, a following processing described in (f) is executed.

(f) The topic reconstructor 31 carries out a topic set reconstruction processing (step S71). This processing will be described in detail later. Incidentally, the execution of the topic reconstruction processing by the topic reconstructor 31 is arbitrary and may not be executed. When the topic set reconstruction processing is ended, the event receiver 23 watches and waits for the occurrence of an event (step S73). When the event occurs, the event receiver 23 judges the content of the occurring event, and instructs the respective processing units in the RSS reader program 3 to execute processing according to the content. The processing executed by the respective processing units having received the processing execution instruction is the following processing described in (g) or (h).

(g) In the case where the occurring event is the event relating to "site periodic patrol" (step S75: Yes route), the article collector 15 and the topic classifier 33 execute a series of article classification processings (step S77 to S91). When the series of article classification processings are ended, the event receiver 23 watches and waits for the occurrence of an event (step S73).

(h) In the case where the occurring event is the event relating to "return to normal mode" (step S75: No route), the classification result extractor 35 executes a classification result display processing (step S93). This processing will be described later in detail. Next, the RSS reader program 3 carries out the second switching of the operation mode. In detail, the event receiver 23 notifies the article collector 15 that the operation mode is switched to the normal mode, and the article collector 15 switches the operation mode in response to the notification. That is, the operation of the article collector 15 in which the acquired article summary is delivered to the topic classifier 33 is switched to the operation to store the acquired article summary into the display candidate queue 19. Then, the procedure proceeds to the processing of the normal mode shown in FIG. 5 through terminal 2.

(f) Topic Set Reconstruction Processing

Figure 12:
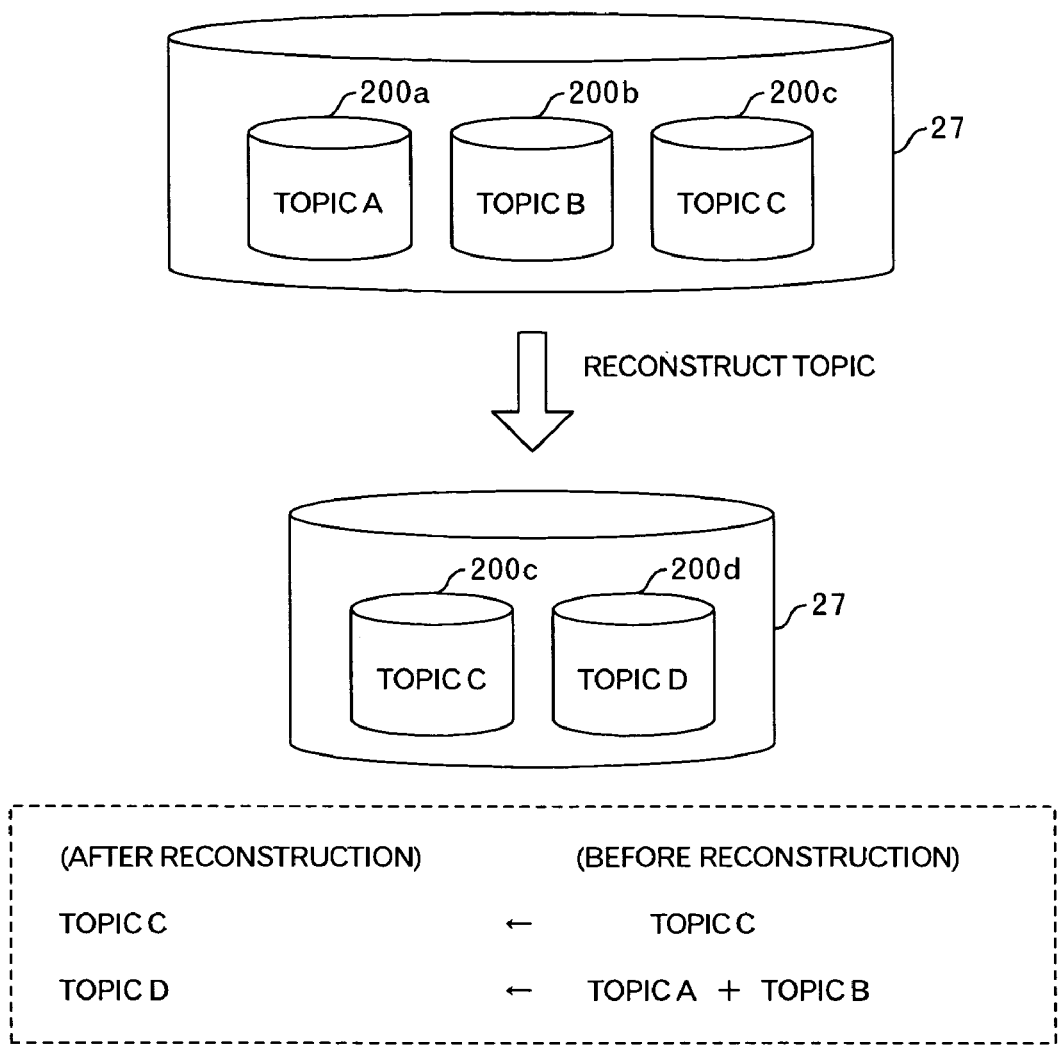
FIG. 12 is a diagram showing the outline of a topic set reconstruction processing.

FIG. 12 schematically shows the topic set reconstruction processing. Many topic sets are stored in the topic database 27 by the topic extraction processing described in the explanation of FIG. 8. Then, when the operation of the RSS reader program 3 shifts to the sleep mode, the topic reconstructor 31 carries out the reconstruction of the topic sets.

FIG. 12 shows a state in which a topic set A (200*a*) and a topic set B (200*b*) become a topic set D (200*d*) by the topic set reconstruction processing. For example, in the case where the topic set A is the set of articles concerning the topic of "Sumatra offshore earthquake", and the topic set B is the set of articles concerning the topic of "Niigata earthquake", these topic sets have the commonality of "earthquake" or "disaster". Then, topic elements of articles included in the topic sets A and B are changed. That is, the topic element "Sumatra offshore earthquake" given to the article summary included in the topic set A and the topic element "Niigata earthquake" given to the article summary included in the topic set B are changed to a new topic element "disaster". Thus, the plural topics are condensed into one topic. FIGS. 14A and 14B show a state in which the topic elements 305 of the first and the second records are changed to "disaster" by the topic set reconstruction processing. In addition, there is shown a state in which by the topic set reconstruction processing, the topic elements 305 of the third and the fourth records are changed to "sport", and the topic elements 305 of the fifth and the sixth records are changed to "economy". The method of collecting the topic sets into the topic set of an upper conception as stated above is generally known as a clustering technique.

Figure 13:
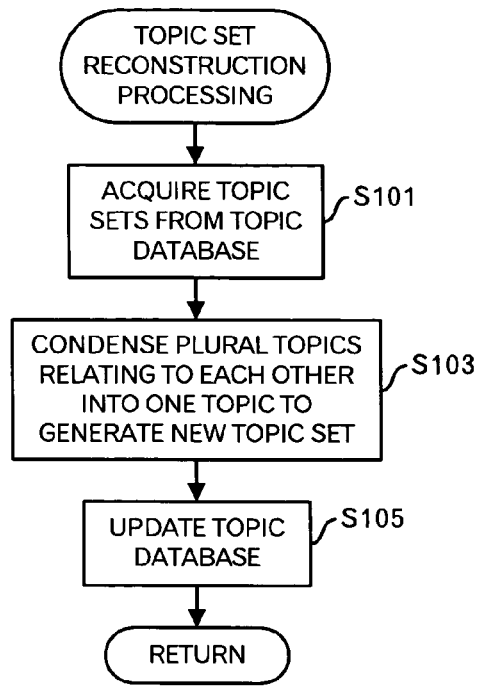
FIG. 13 is a diagram showing a topic set reconstruction processing.

FIG. 13 shows the detailed procedure of the topic set reconstruction processing. When the notification that the mode is shifted to the sleep mode is received from the event receiver 23, the topic reconstructor 31 acquires the topic sets from the topic database 27 (step S101), judges whether the plural acquired topic sets relate to each other, condenses the topic sets related to each other into one topic set, defines a new topic set (step S103), and updates the topic database 27 (step S105). When the update of the topic database 27 is ended, the article collector 15 is made to be capable of patrolling sites. However, the article summary relating to the RSS document acquired from the article providing site 13 in the sleep mode is not stored in the display candidate queue 19, but is delivered to the topic classifier 33.

Incidentally, for the reconstruction of the topic sets, two methods are mainly conceivable. One is a method of reconstructing topic sets at the level of topic sets. This method is also the method in which an article summary included in a certain topic set is not moved to another topic set, and is the method described in the explanation of FIG. 12 and the like. The other is a method in which the topic database 27 is reconstructed overall at the level of article summaries, and according to the circumstances, an article summary is moved between the topic sets.

(g) Article Classification Processing

With reference to FIG. 11 again, the series of article classification processings (steps S77 to S91) will be described. In response to the site patrol instruction from the event receiver 23, the article collector 15 refers to the bookmark 17, downloads the RSS document from the article providing site 13, and delivers the article summary relating to the acquired RSS document to the topic classifier 33 (step S77). The topic classifier 33 stores the article summary delivered from the article collector 15 into a predetermined area (for example, a predetermined area of the storage device), and judges whether or not there is an article summary to which the classification processing has not been carried out by judging whether or not an article summary remains in the area (step S79). In the case where an article summary remains in the area, that is, in the case where there is an article summary to which the classification judgment has not been carried out (step S79: Yes route), the topic classifier 33 acquires one article summary from the area, and calculates the relevance degree between the article summary and the topic set stored in the topic database 27 (step S81). As a result of the calculation of the relevance degree, in the case where it is judged that the article summary can be classified into one of the topic sets stored in the topic database 27 (step S83: Yes route), the topic classifier 33 gives the topic element concerning the topic set of the classification destination to the article summary and registers it in the topic database 27 (step S85), and further registers the article summary in the display candidate queue 19 (step S87). Then, the article summary stored in the predetermined area of the storage device is deleted.

In the case where the article summary cannot be classified into any topic sets (step S83: No route), the topic classifier 33 discards the article summary (step S89). Then, the article summary is deleted from the predetermined area of the storage device. As long as there is an article summary in the predetermined area of the storage device (step S79: Yes route), the topic classifier 33 carries out the processing in the steps S81 to S89, and then deletes the article summary from the predetermined area of the storage device. When the article summary disappears from the area, that is, the article summary to which the classification judgment has not been carried out disappears (step S79: No route), the topic classifier 33 resets an event relating to the site patrol (step S91), and the event receiver 23 watches and waits for the occurrence of an event (step S73).

Incidentally, because the resetting processing of the site patrol event has been also described in FIG. 6, the description will be omitted.

Here, the details of the processing at the step S81 will be described. When the topic set stored in the topic database 27 is defined as $C_k$ ($k=1, 2, \ldots, n$), in the processing of classifying the RSS document into the topic set, a problem that an article summary x acquired from the site and relating to the RSS document is assigned to $C_k$ is dealt by a following expression (4):

$$C = f(x), C \in \{C_k | k=1, 2, \ldots, n\} \qquad (4)$$

The problem as stated above is known as a classification problem, and $f(x)$ is called a classifier function.

Besides, a technique to construct the classifier function $f(x)$ from the topic database 27 is known. For example, in an NN method (Nearest Neighbor Method), by using the similarity degree function $S_x(y)$ described above, the article summary x is assigned to the topic set to which the article summary y with the highest similarity degree belongs. With respect to the NN method, please refer to "S. Chakrabarti, Mining the Web-Discovering knowledge from Hypertext Data-, pp. 133-136, Morgan Kaufmann Pub. (2003)", the contents of which are incorporated herein by reference.

Besides, a technique to construct a following classifier function is also known.

$$[p1, p2, \ldots, pk] = f(x)$$

$$C \in \{C_k | k=1, 2, \ldots, n\} \qquad (5)$$

This classifier function $f(x)$ calculates a certainty factor (that is, probability) $p_k$ when the article summary x is assigned to $C_k$. Then, data x is classified into $C_k$ in which $p_k$ becomes maximum. In the topic classifier 33 in this embodiment, in the case where the maximum value $p_{max}$ of the certainty factor is a fixed value or less, the judgment of classification is suspended. That is, with respect to a previously determined value ($\sigma$), in the case of $p_{max} \geq \sigma$, the article summary is assigned to $C_k$ in which $p_K = p_{max}$ is established. On the other hand, in the case of pmax<σ, the article summary is not assigned to any topics.

Incidentally, records (that is, article summaries) shown in FIG. 14C are obtained in such a manner that after the RSS reader program 3 shifts to the sleep mode, the processing indicated at the step S85 of FIG. 11 is carried out and the registration is made in the topic database 27. In the classification result display processing described later, in order that the classification result extractor 35 recognizes these records as being registered after the mode is shifted to the sleep mode (that is, newly-arrived articles), it is desirable that the date when the mode is shifted to the sleep mode is stored in a predetermined area of the topic database 27. Alternatively, when the topic classifier 33 carries out the registration processing to the topic database 27, there is also a system in which a predetermined flag (for example, newly-arrived flag) is given to the record shown in FIG. 14C. In the case of the system in which the newly-arrived flag is given, it is necessary that the topic reconstructor 31 initializes the newly-arrived flag by the foregoing topic set reconstruction processing.

As shown in FIGS. 14A to 14C in which the article summaries relating to the RSS documents are shown in the table format, in the topic database 27, there is also a method in which the article summaries are managed as records by the relational database. FIGS. 14A to 14C shows merely the <link/> column (301a) and the <dc:date/> column (301b) which are the compound key, the <topic/> column (305), and the <title/> column. On the other hand, in the topic database 27, there is also a method in which the RSS document as shown in FIG. 3A is managed in file units, that is, it is managed as the XML file.

(3) Return to the Normal Mode (h) Classification Result Display Processing

The classification result display processing by the classification result extractor 35 is carried out when the event receiver 23 detects the event relating to "return to normal mode" and notifies a processing execution instruction to the classification result extractor 35. The event relating to "return to normal mode" is a user event generated when the user uses the operation unit 7 to issue some instruction, for example, an event generated when the user gives an instruction to display an article, or an event generated when the user gives an instruction to return the minimized program window to the original size.

Figure 15:
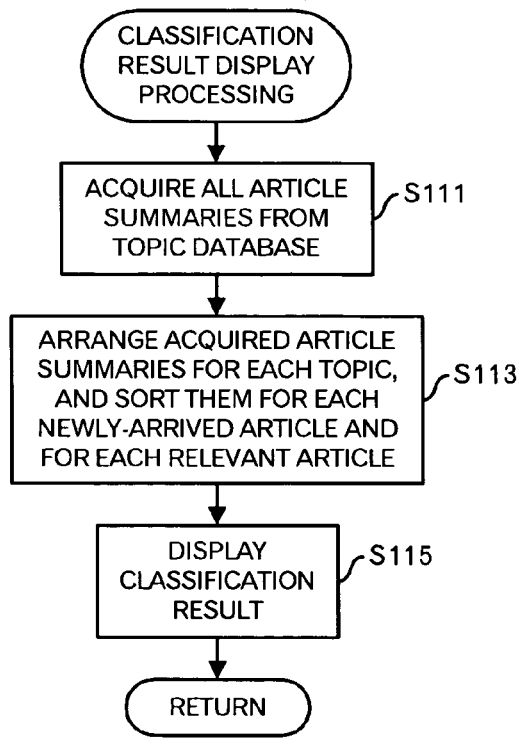
FIG. 15 is a diagram showing a classification result display processing.

FIG. 15 shows the details of the classification result display processing. In response to the processing execution instruction from the event receiver 23, the classification result extractor 35 acquires all article summaries from the topic database 27 (step S111). In accordance with the topic elements given to the acquired article summaries, they are grouped for each topic, and further, the article summaries are arranged into newly-arrived articles and relevant articles for each of the topics. The "newly-arrived article" here is the article summary registered in the topic database 27 in the sleep mode. Besides, the "relevant article" is the article summary registered in the topic database 27 before the shift to the sleep mode. When a judgment is made as to whether the article summary is the newly-arrived article or the relevant article, a system may be such that the judgment is made by referring to the date of the shift to the sleep mode stored in the predetermined area of the topic database 27, or a system may be such that reference is made to the newly-arrived flag given to the article summary. At this time, the classification result extractor 35 may sort the article summaries by the update date element of the article summary (<dc:date/> tag) (step S113). It displays the result on the classification result display unit 9 (step S115).

Incidentally, when the article summary is acquired at the step S111, instead of acquiring all article summaries, the classification result extractor 35 may first acquire the article summary of the newly-arrived article, and next acquire the article summary of the relevant article of the newly-arrived article. By such acquiring processing, because the topic set including only the relevant articles is not displayed on the classification result display unit 9, the user can more effectively refer to the newly-arrived articles.

Figure 16:
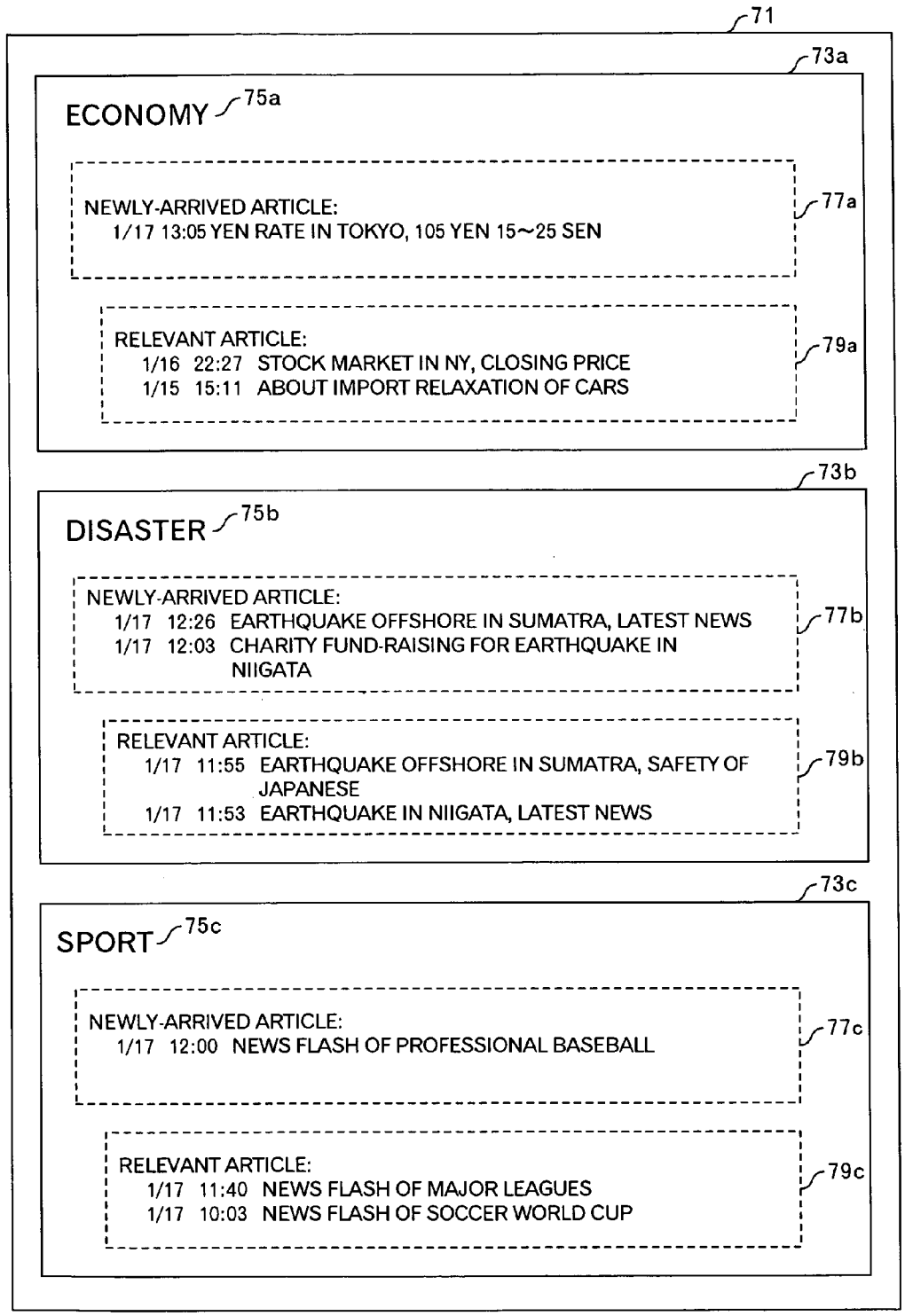
FIG. 16 is a diagram illustrating a state in which classification results are displayed.

FIG. 16 shows a display example of classification results. The article summaries acquired from the topic database 27 are arranged and displayed for each topic as shown in topic display parts 73a, 73b and 73c of a classification result display screen 71. In the respective topic display parts, topic names are displayed as indicated by topic name display parts 75a, 75b and 75c. Further, in the respective topic display parts, as indicated in newly-arrived article display parts 77a, 77b and 77c, article summaries are displayed as newly-arrived articles. Similarly, as indicated in relevant article display parts 79a, 79b and 79c, article summaries are displayed as relevant articles. The article summary displayed at each of the newly-arrived article display parts 77 of the classification result display screen 71 corresponds to the article summary shown in FIG. 14C, and the article summary displayed at each of the relevant article display parts 79 corresponds to the article summary shown in FIG. 14B.

Incidentally, at the time point when the article collector 15 stores the article summary in the display candidate queue 19, the order of arrangement of the article summaries in the display candidate queue 19 is the order in which the article collector 15 acquires the RSS document corresponding to the article summary from the article providing site 13, and is irrelevant to the mutual relevancy of the article summaries. Then, the RSS reader program 3 according to the first embodiment of the invention generates the topic set, when the user operates to acquire the article body concerning the article summary being displayed on the article display unit 5, and changes the order of arrangement of the article summaries stored in the display candidate queue 19. By the change of the order of arrangement, also with respect to the article summaries relevant to the article summary being displayed, because the order of display is changed, the user can efficiently get the article summaries.

Besides, in the sleep mode, because the article summary, which is not classified into any of the topic sets in the topic database 27 by the processing of the topic classifier 33, is discarded, the user does not need to carry out an operation to find an interesting article summary among uninteresting article summaries. Accordingly, the user can efficiently get the article summary.

Modified Example of the First Embodiment of the Invention

When the topic extractor 25 registers the article summary being displayed and the article summary relevant to this into the topic database 27, instead of registering them as a new topic set into the topic database 27, a judgment may be made as to the similarity degree to the topic set already defined on the topic database 27, and they are additionally registered in the existing topic set.

Second Embodiment of the Invention

Figure 17:
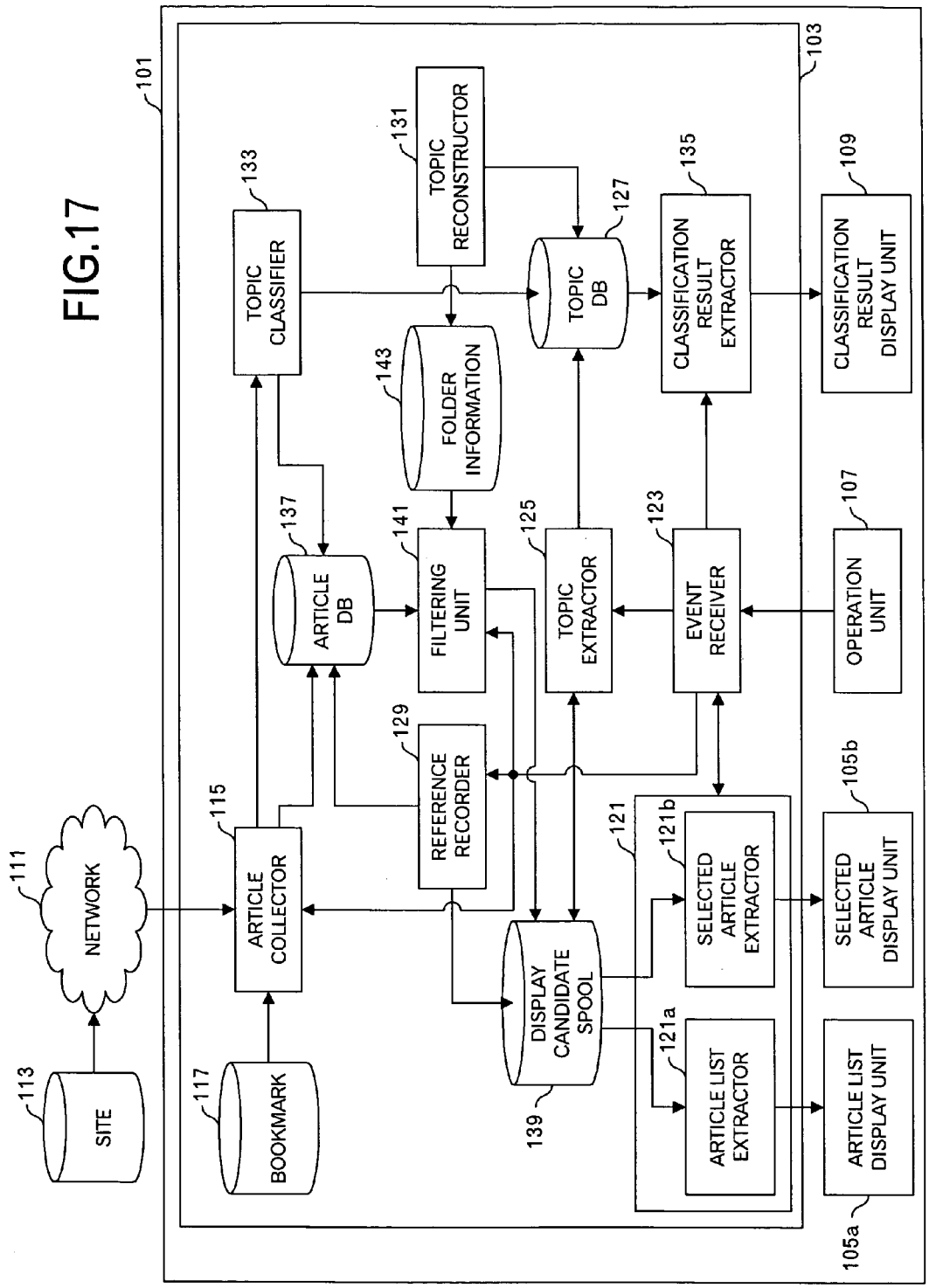
FIG. 17 is a functional block diagram showing the outline of a second embodiment of the invention.

Next, a second embodiment of the invention will be described with reference to FIGS. 17 to 27. As shown in FIG. 17, a computer 101 in the second embodiment of the invention is an apparatus to execute a mail-client type RSS reader program 103, and includes an RSS reader program 103 and, as an input and output interface, an article list display unit 105a, a selected article display unit 105b, an operation unit 107, and a classification result display unit 109. The computer 101 is connected to article providing sites 113 through a network 111 such as, for example, the Internet. The RSS reader program 103 executed by the computer 101 is the program which acquires RSS documents from the article providing sites 113, manages article summaries relating to the acquired RSS documents, and integrates one or plural article summaries into one group as the need arises. That is, the RSS reader program 103 groups one or plural article summaries into one set and manages them. The RSS reader program 103 includes an article collector 115, a bookmark 117, a display article extractor 121 (an article list extractor 121a, a selected article extractor 121b) an event receiver 123, a topic extractor 125, a topic database 127, a reference recorder 129, a topic reconstructor 131, a topic classifier 133, a classification result extractor 135, an article database 137, a display candidate spool 139, a filtering unit 141 and a folder information 143. Incidentally, because the meanings of "grouping", "topic set", "topic element" and the like are the same as those described in the first embodiment of the invention, their description will be omitted.

Here, a program window 151 of the RSS reader program 103 will be described with reference to FIG. 18. The program window 151 includes a folder display part 153, an article list display part 161, and a selected article display part 163. The folder display part 153 further includes a site folder display part 155 to store sites (bookmark site folders 165a to 165x) registered in the bookmark 117, a user definition folder display part 157 to store user definition folders 167a and 167b, and a topic folder display part 159 to store topic folders 169c and 169d.

When the user selects (that is, clicks) a folder (one of the folders 165, 167 and 169) from the folder display part 153, a list of article summaries belonging to the selected folder are displayed on the article list display part 161. Further, when the user selects one of the article summaries displayed on the article list display part 161, apart of or all of the details of the selected article summary is displayed on the selected article display part 163.

Figure 18:
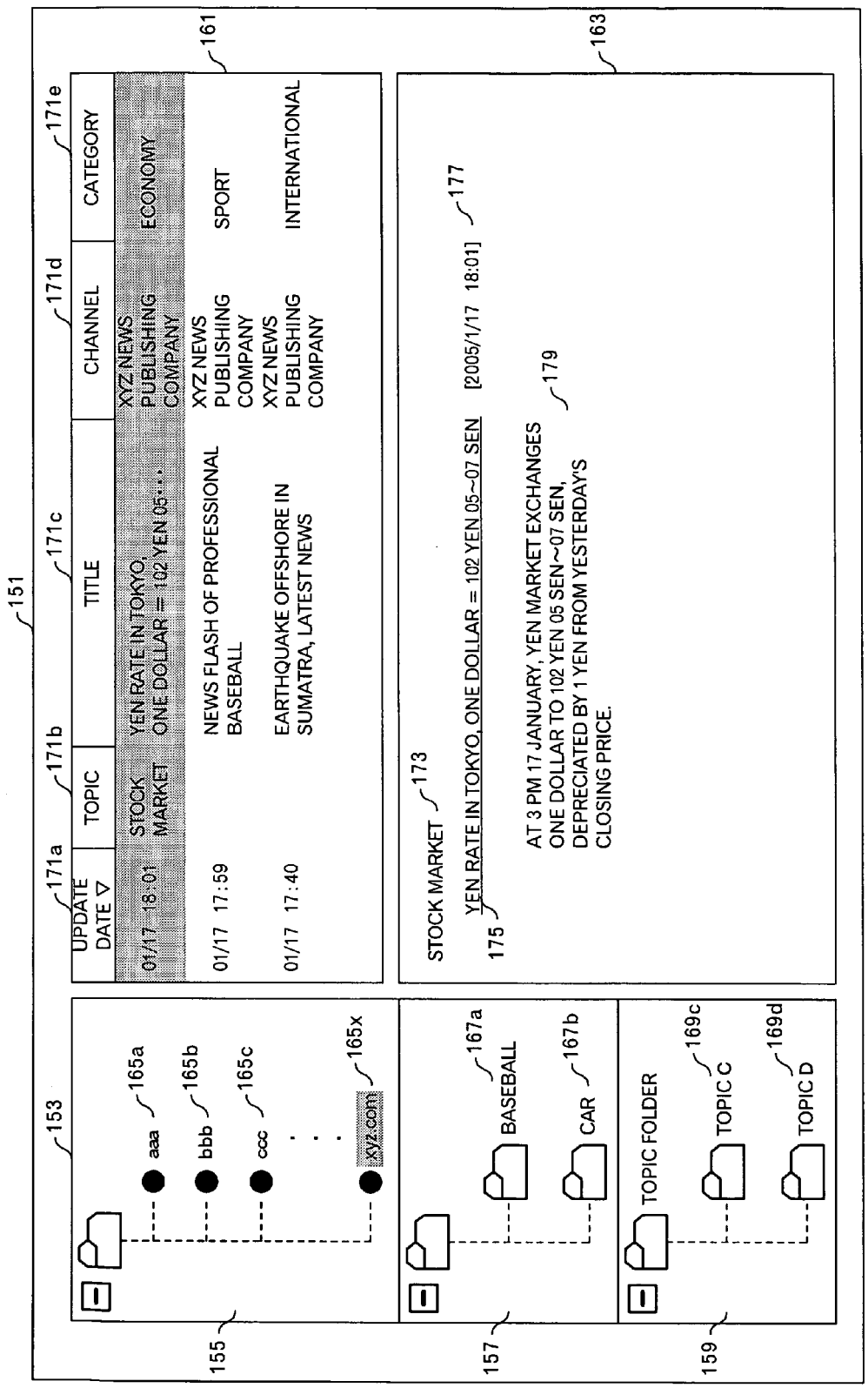
FIG. 18 is a diagram illustrating a program window of a mail-client type RSS reader.

FIG. 18 shows a state in which the user selects the bookmark site folder 165x "xyz.com", and further selects the article summary at the uppermost stage listed on the article list display part 161, and as a result, a part of the details of the article summary selected by the user is displayed on the selected article display part 163. Besides, element names of article elements are displayed at the upper part of the article list display part 161 so that the user can easily visually identify the article summary. In FIG. 18, the element names of "update date" (171a), "topic" (171b), "title" (171c), "channel" (171d), and "category" (171e) are displayed. Portions displaying these article element names are buttons to receive user instructions, and when the user clicks one of the buttons 171a to 171e, the article summaries displayed on the article list display part 161 are sorted by the article element relating to the button click. FIG. 18 shows the state in which sorting is made by the update date and in order of arrival. Besides, in the case where the topic element is given to the article data, the content is displayed.

The content of the RSS document 300 shown in FIG. 3A is displayed as the details of the article summary on the selected article display part 163. Reference numeral 175 denotes the content of the <title/> element of the RSS document 300, which is hyperlink displayed, and the link destination is the content of the <link/> element. When the user clicks the hyperlink 175, the whole of the article document acquired from the link destination is displayed on the selected article display part 163. Reference numeral 177 denotes the content of the <dc:date/> element, and 179 denotes the content of the <description/> element. In the case where the topic element (<topic/> element) is given to the RSS document 300, as denoted by 173, words such as "stock market price" are displayed as the topic information.

Incidentally, in FIG. 18, partial user interfaces, such as an output interface relating to the display of the program window 151, an input interface for performing "selection of folder" with respect to the folders displayed on the folder display part 153, and an input interface for performing "selection of article summary" with respect to the article summary displayed on the article list display part 161, are merely explained. It is also possible to provide a user interface such as a button to realize a function comparable to the button 49 for performing "deletion of topic".

Returning to FIG. 17 again, the article collector 115 refers to the bookmark 117, acquires an RSS document from the article providing site 113, and registers an article summary concerning the acquired RSS document into the article database 137. In the sleep mode, the article summary concerning the acquired RSS document is delivered to the topic classifier 133. Because the other functions of the article collector 115 are similar to those described in the first embodiment of the invention, their description will be omitted.

The display candidate spool 139 is a storage area for temporarily storing article summaries as display objects when the article summaries are displayed on the article list display unit 105a or the selected article display unit 105b. The article list extractor 121a acquires all the article summaries from the display candidate spool 139, and lists them on the article list display unit 105a. At that time, it is desirable that the article summaries are sorted by one of the article elements of the RSS document. When one article summary is selected from the article summaries displayed on the article list display unit 105a, the selected article extractor 121b acquires the article summary from the display candidate spool 139, or acquires the article summary from the article list extractor 121a in the case where the article list extractor 121a holds the article summary, and displays the content of the article summary on the selected article display unit 105b in a predetermined format as explained in FIG. 18.

The event receiver 123 receives an event, judges the received event, and instructs the respective processing units to carry out processing. The event as stated above includes a user event generated as a result that the use uses the operation unit 107 to instruct the RSS reader program 103. Besides, when instructing the respective processing unit to carry out the processing, as the need arises, the event receiver 123 acquires the data, which relates to the article summary list being displayed on the article list display unit 105a and relates to the article summary selected by the user, from the article list extractor 121a. When the selection by the user is the selection of one article summary, the event receiver 123 acquires the data relating to the one article summary, and when the selection by the user is the selection of plural article summaries, the event receiver 123 acquires the data corresponding to each of the article summaries.

When the event receiver 123 detects the occurrence of the event relating to "selection of folder" and notifies a processing execution instruction relating to the occurring event to the filtering unit 141, the filtering unit 141 refers to the folder information 143 in response to the notification, extracts the article summary belonging to the bookmark folder under the selected folder from the article database 137, and stores it in the display candidate spool 139.

When the event receiver 123 detects the occurrence of the event relating to "opening of article" or "display of article" and notifies a processing execution instruction relating to the occurring event to the topic extractor 125, the topic extractor 125 uses the article summary already stored in the display candidate spool 139 to carry out the topic extraction processing. The topic extraction processing here is basically the same as the topic extraction processing described in the first embodiment of the invention, and the topic extractor 125 registers the generated topic set in the topic database 127, and stores the data of the article summaries included in the topic set at the head of the display candidate spool 139 so that the article summaries included in the topic set are displayed on the article list display unit 105a in order from the article summary selected by the user. Incidentally, the event relating to "opening of article" or "display of article" in the second embodiment of the invention will be described later.

In response to the notification from the event receiver 123 that an already-read instruction (instruction from the operation unit 107) event from the user has occurred, the reference recorder 129 sets ON to an already-read flag for the article summary relating to the already-read instruction event in the display candidate spool 139. Besides, the reference recorder 129 sets ON to the already-read flag to the same article summary in the article database 137 as the need arises. Similarly to the first embodiment, the setting of the already-read flag includes the setting to the article summary included in the designated topic in addition to the setting to the article summary.

At the time of shift to the sleep mode, the topic reconstructor 131 reconstructs the topic sets stored in the topic database 127, and further, in order to generate the topic folder 169 corresponding to each of the reconstructed topic sets, the topic reconstructor 131 stores data (for example, topic elements) concerning the topic sets into the topic folder area of the folder information 143.

The topic classifier 133 judges whether or not the article summary delivered from the article collector 115 can be classified into one of the topic sets stored in the topic database 127. In the case where it can be classified, the topic classifier 133 gives the topic element concerning the topic set of the classification destination to the article summary, and registers the article summary to which the topic element is given into the database 127. The article summary to which the topic element is given is also registered into the article database 137. In the case where the classification cannot be made, the topic classifier 133 does not register the article summary in the topic database 127, but registers it only in the article database 137.

The classification result extractor 135 is quite the same as the foregoing classification result extractor 35, the description will be omitted. Incidentally, although the state of already-read or not-read for the article is managed and is displayed, because this point is the same as the background art, a further explanation is not made here.

[Description of Detailed Operation]

Hereinafter, the detailed operation of the RSS reader program 103 will be described with reference to FIGS. 19 to 27. Here, the description will be made in order of (4) in normal mode and (5) in sleep mode. Incidentally, because the detailed description of (6) in return to normal mode is quite the same as that of the first embodiment of the invention, its description will be omitted.

(4) Operation in Normal Mode

Figure 19:
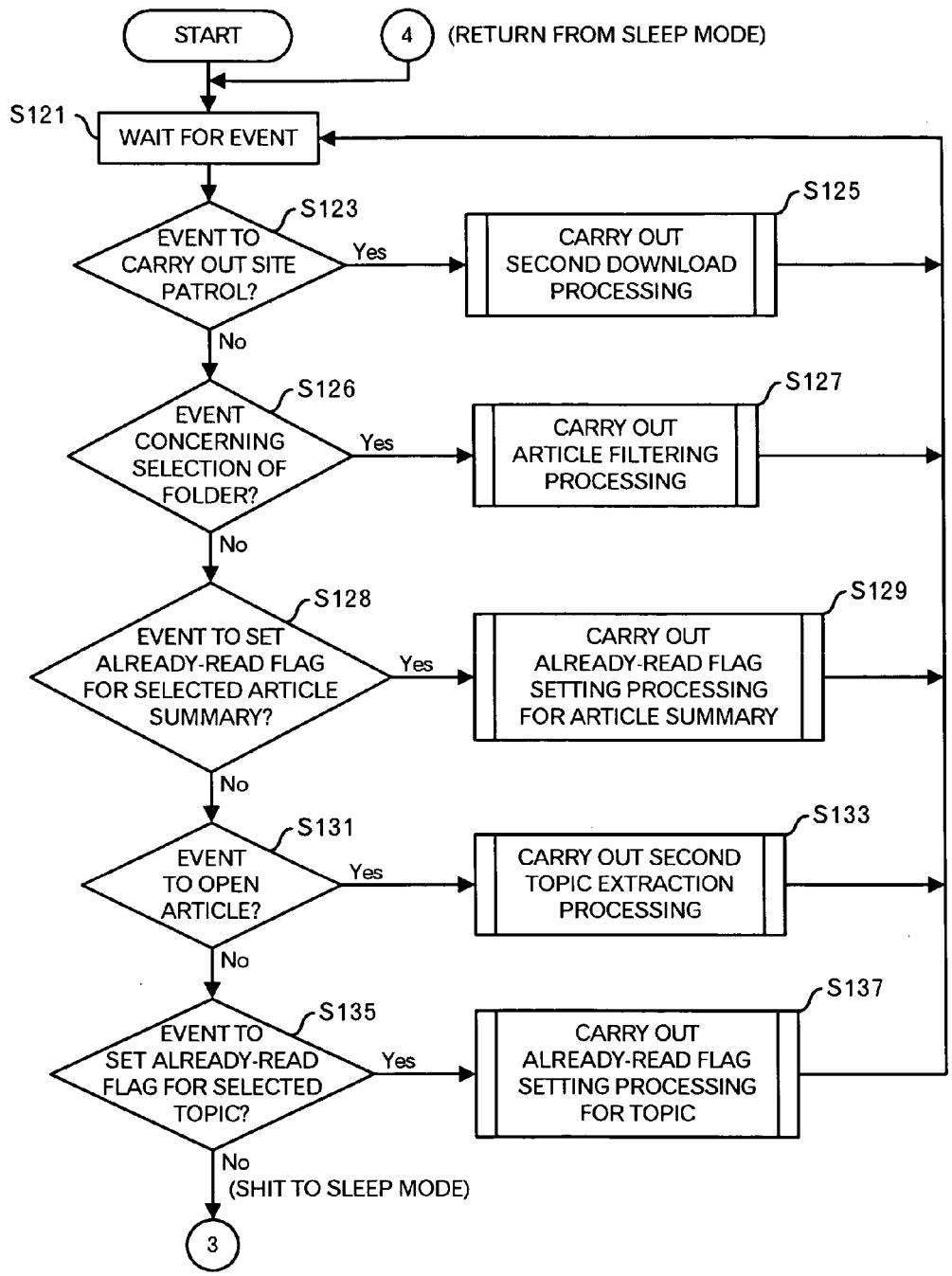
FIG. 19 is a diagram showing a second basic operation processing of a program in a normal mode.

As shown in FIG. 19, the event receiver 123 of the RSS reader program 103 watches and waits for the occurrence of a user event concerning the operation instruction from the operation unit 107 by the user, or an event concerning the processing instruction from the event receiver 123 itself (step S121). When the event occurs, the event receiver 123 judges the content of the occurring event, and according to the content, instructs the respective processing units in the RSS reader program 103 to carry out processing. The processing carried out by the respective processing units having received the processing execution instruction is the processing described in (i) to (n) below.

(i) In the case where the occurring event is the event relating to "site patrol" (step S123: Yes route), the article collector 115 carries out "a second article download processing" (step S125). When the second article download processing is ended, the event receiver 123 watches and waits for the occurrence of an event (step S121).

(j) In the case where the occurring event is the event relating to "selection of folder" (step S126: Yes route), the filtering unit 141 carries out "an article filtering processing" (step S127). When the article filtering processing is ended, the event receiver 123 watches and waits for the occurrence of an event (step S121).

(k) In the case where the occurring event is the event relating to "setting of already-read flag for selected article summary" (step S128: Yes route), the reference recorder 129 carries out "an already-read flag setting processing for article summary" (step S129). When the already-read flag setting processing for the article summary is ended, the event receiver 123 watches and waits for the occurrence of an event (step S121).

(l) In the case where the occurring event is the event relating to "opening of article" or "display of article" (step S131: Yes route), the topic extractor 125 carries out "a second topic extraction processing" (step S133). When the second topic extraction processing is ended, the event receiver 123 watches and waits for the occurrence of an event (step S121).

(m) In the case where the occurring event is the event relating to "setting of already-read flag for selected topic" (step S135: Yes route), the reference recorder 129 carries out "already-read flag giving processing to topic" (step S137). The already-read flag setting processing to the topic is ended, the event receiver 123 watches and waits for the occurrence of an event (step S121).

(n) In the case where an event other than the above occurs (step S135: No route), the procedure proceeds to the processing of the sleep mote shown in FIG. 25 through terminal 3.

Incidentally, the content of the occurring event in the second embodiment of the invention will be described in detail in the detailed description of the following processing procedure of (i) to (n).

(i) Second Article Download Processing

The second article download processing in the article collector 115 is carried out when the event receiver 123 detects the event relating to "site patrol", and notifies a processing execution instruction of the site patrol to the article collector 115. Here, the event relating to "site patrol" in the first embodiment of the invention is only the timer event, whereas the event relating to "site patrol" in the second embodiment of the invention includes the user event generated as a result that the user uses the operation unit 107 to give an instruction of the site patrol.

Figure 20A:
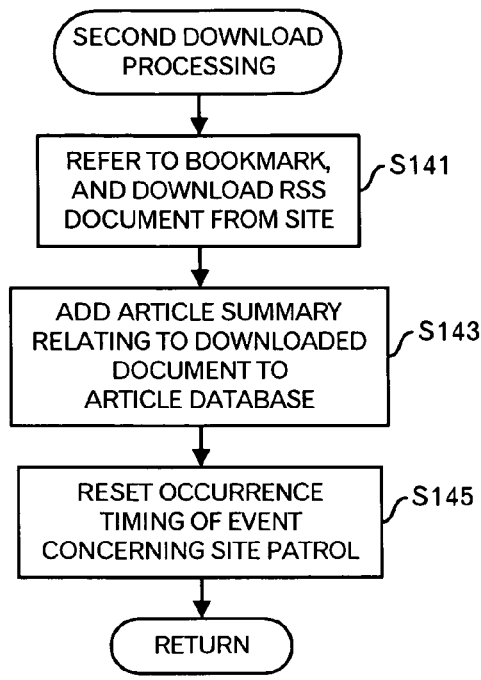
FIG. 20A is a diagram showing a second article download processing.

As shown in the flowchart of FIG. 20A, in response to the event relating to the site patrol from the event receiver 123, the article collector 115 acquires a URL from the bookmark 117, downloads an RSS document from the article providing site 113 based on the acquired URL (step S141), and adds an article summary relating to the downloaded RSS document to the database 137 (step S143). In the case where there are plural article providing sites 113 to be patrolled, the steps S141 and S143 are repeated. When the download processing of the RSS document from the article providing site 113 and the addition processing of the article summary relating to the RSS document to the article database 137 are ended, the event receiver 123 resets the occurrence timing of the event relating to the site patrol (step S145). Incidentally, in the resetting processing, the article collector 115 may carry out the resetting processing, and may notify the result of the resetting processing to the event receiver 123. Because the event relating to the site patrol has been described in detail in "(a) article download processing", its description will be omitted.

(j) Article Filtering Processing

Figure 20B:
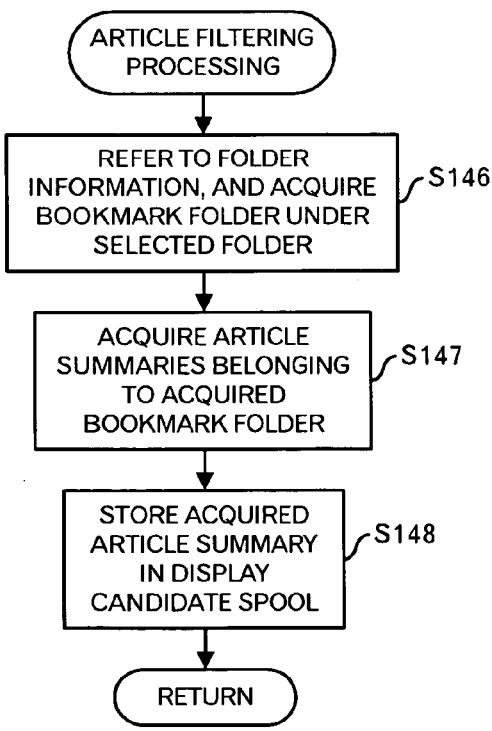
FIG. 20B is a diagram showing an article filtering processing.

FIG. 20B shows the article filtering processing carried out by the filtering unit 141. When the event receiver 123 detects the event relating to "selection of folder", and notifies a processing execution notification including data relating to the article summary selected by the user and the selected folder, the filtering unit 141 refers to the folder information 143, and acquires the bookmark folder under the selected folder (step S146). The filtering unit 141 acquires the article summary belonging to the acquired bookmark folder from the article database 137 (step S147). And then, the filtering unit 141 stores the acquired article summary in the display candidate spool 139 (step S148).

(k) Already-Read Flag Setting Processing for the Article Summary

Figure 21:
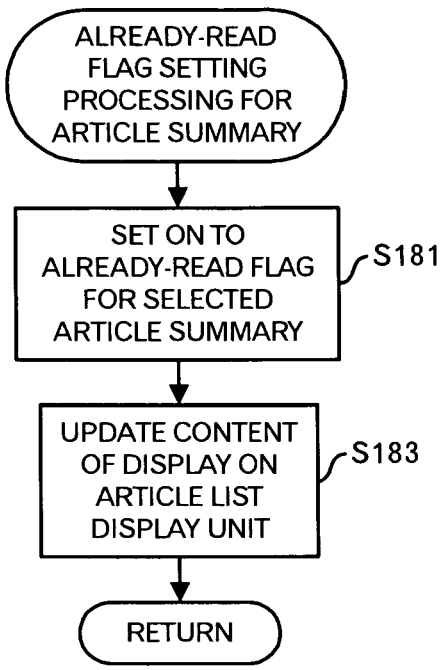
FIG. 21 is a diagram showing an already-read flag setting processing for an article summary.

FIG. 21 shows an example, as the already-read flag setting processing for the article summary, in which the "already-read flag" for the article summary so that the article summary is set to ON, is managed. In response to the processing execution instruction relating to the setting of the already-read flag for the selected article summary from the event receiver 123, the reference recorder 129 sets ON to the already-read flag for the article summary selected by the user. In this case, the already-read flag is set to ON for the article summary in the display candidate spool 139, and as the need arises, the already-read flag is set to ON also for the article summary in the article database 137 (step S181). When the setting of the already-read flag is ended, in order to update (refresh) the content displayed on the article list display unit 105a, the reference recorder 129 instructs the article list extractor 121a to list the article summaries stored in the display candidate spool 139 (step S183). In response to the instruction from the reference recorder 129, the article list extractor 121a displays the article summaries stored in the display candidate spool 139 on the article list display unit 105a. The refresh of the article list display unit 105a is the effective processing procedure in the case where for example, an icon indicating the state of already-read or not-read is displayed for each of the article summaries displayed on the article list display unit 105a, or in the case where the unread article summaries displayed on the article list display unit 105a are listed in thick letters, while the read article summaries are listed in thin letters.

(l) Second Topic Extraction Processing

The second topic extraction processing by the topic extractor 125 is carried out when the event receiver 123 detects the event relating to "opening of article" or "display of article" and notifies a processing execution instruction relating to the event to the topic extractor 125. Here, the event relating to "opening of article" or "display of article" in the second embodiment of the invention is a user event generated as a result that the user uses the operation unit 107 to give an instruction similarly to the first embodiment of the invention, for example, a user event generated as a result that the user double-clicks the article summary displayed on the article list display unit 161, or a user event generated as a result that the user clicks an article title included in the article summary being displayed on the selected article display part 163.

When notifying the processing execution instruction to the topic extractor 125, the event receiver 123 acquires data relating to the article summary displayed on the article display unit 121, that is, data of the article summary being displayed from the selected article extractor 121b, and transmits the data of the article summary being displayed to the topic extractor 125.

Figure 22:
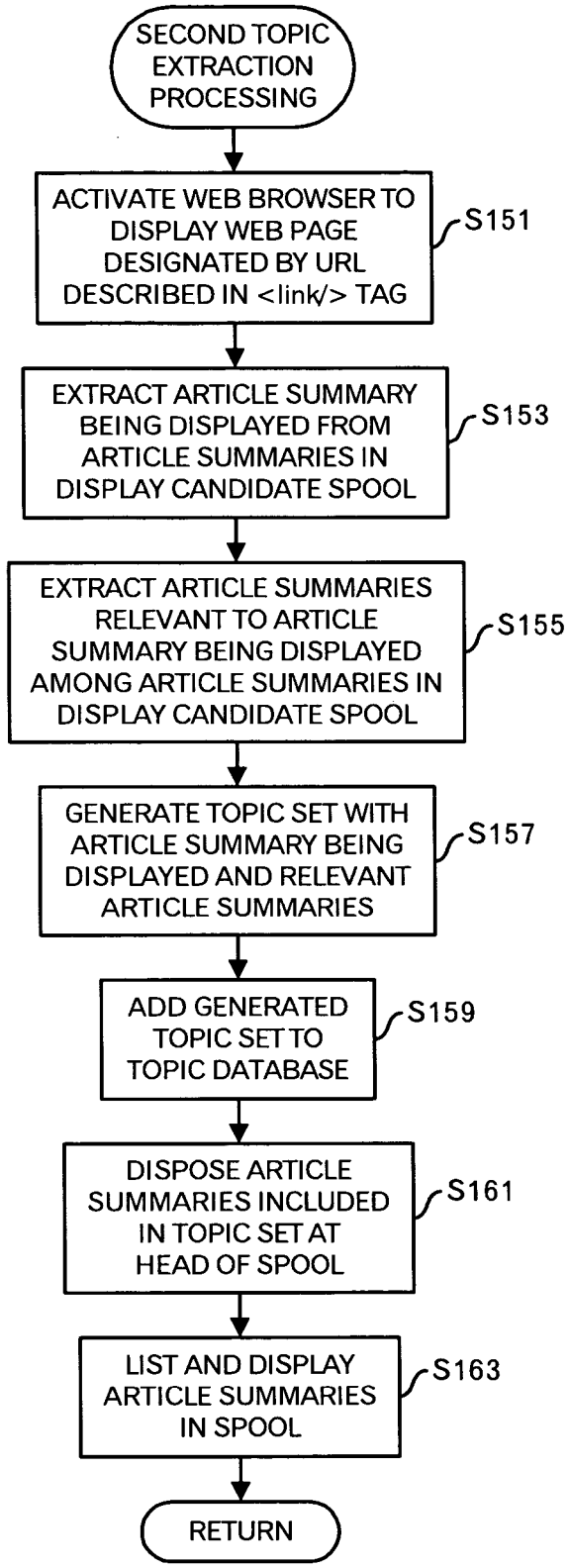
FIG. 22 is a diagram showing a second topic extraction processing.

FIG. 22 shows the details of the second topic extraction processing. The topic extractor 125 activates the Web browser. At that time, a URL described in the <Link/> tag of the article summary transmitted from the event receiver 123 and being displayed is given to the Web browser (step S151). The Web browser accesses the URL, acquires the whole article document concerning the article summary being displayed, and displays it on the display device. Incidentally, in the mail-client type RSS reader, although the Web browser may be activated as the independent window, it is desirable to adopt means for activating the Web browser in the form of incorporating it into the selected article display part 163.

The event receiver 123 acquires, in addition to the notification, data relating to the selected article summary (that is, the article summary which is being displayed on the selected article display unit 105b and is selected by the user) and data relating to the selected folder from the display article extractor 121, and notifies them to the topic extractor 125. The topic extractor 125 receives the data relating to the article summary selected by the user and being displayed and the data relating to the selected folder (step S153).

The topic extractor 125 extracts an article summary relevant to the article summary being displayed among the remaining article summaries (step S155). Because the details of the processing at the step S155 is similar to what is described in the first embodiment of the invention (that is, what is described in detail in the description of the step S33 of FIG. 8), the description will be omitted. When the article summary relating to the article summary being displayed is extracted, the topic extractor 125 gives the topic element <topic/> as described in FIGS. 2 and 3 to generate the topic set with the article summary being displayed and the relevant article summary (step S157), and additionally registers the generated topic set in the topic database 27 (step S159). Further, the topic extractor 125 disposes the article summary included in the topic set at the head of the display candidate spool 139 so that the article summary included in the topic set is displayed at an upper position in the list display (step S161), and in order to update (refresh) the content displayed on the article list display unit 105a, the topic extractor instructs the article list extractor 121a to list and display the article summaries stored in the display candidate spool 139 (step S163). In response to the instruction from the topic extractor 125, the article list extractor 121a displays the article summaries stored in the display candidate spool 139 on the article list display unit 105a.

Here, data flow in which a relevant article summary is extracted will be described with reference to FIGS. 23A to 23C. FIG. 23A shows the structure of the article summaries before the second topic extraction processing is executed. At this time point, the topic element is not given to any article summaries. In the second topic extraction processing, first, in response to the instruction to select an article summary from the user, the article summary in the first line of FIG. 23A is specified. On the basis of this article summary in the first line, relevant article summaries are extracted. FIG. 23B shows a state in which the article summary having similarity degree A1 with respect to the article summary in the first line is extracted. The order of arrangement of the article summaries shown in FIG. 23B is also the order of arrangement of the article summaries displayed on the article list display part 161 of FIG. 18. As shown in FIGS. 23A and 23B, the topic element 305 (<topic/>) "Sumatra offshore earthquake" is given to the article summary in the first line and the article summary having the similarity degree A1, and these article summaries are displayed at the uppermost position of the list. With respect to the article summaries irrelevant to the topic set of "Sumatra offshore earthquake", the order of arrangement is not changed.

(m) Already-Read Flag Setting Processing for Topic

The reference recorder 129 executes not only the foregoing already-read flag setting processing for the article summary, but also the already-read flag setting processing for the topic. The already-read flag setting processing for the topic described here is carried out when the event receiver 123 detects the event relating to "already-read flag setting processing for selected topic", and notifies a processing execution instruction relating to the event to the reference recorder 129. The event relating to "already-read flag setting processing for selected topic" is the user event generated by user's instruction similarly to the event relating to "deletion of topic" described in the first embodiment of the invention.

Figure 24:
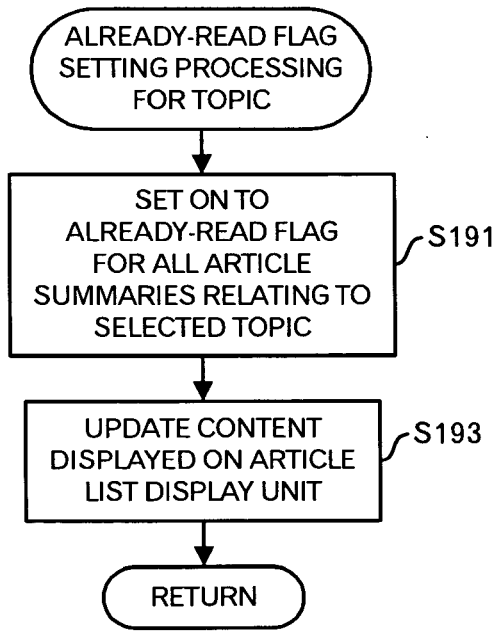
FIG. 24 is a diagram showing an already-read flag setting processing for a topic.

FIG. 24 shows the details of the already-read flag setting processing for the topic. In response to the processing execution instruction relating to the already-read flag setting processing for the selected topic from the event receiver 123, the reference recorder 129 refers to the content of the topic element (<topic/> tag) given to the article summary selected by the user, that is, the article summary relating to the user selection, and sets ON to the already-read flag for all article summaries having the content of the same topic element. In this case, the already-read flag is set to ON for the article summaries in the display candidate spool 139, and as the need arises, the already-read flag is also set to ON for the article summary in the article database 137 (step S191). When the setting of the already-read flag is ended, in order to update (refresh) the content displayed on the article list display unit 105a, the reference recorder 129 instructs the article list extractor 121a to display and list the article summaries stored in the display candidate spool 139 (step S193) In response to the instruction from the reference recorder 129, the article list extractor 121a displays the article summaries stored in the display candidate spool 139 on the article list display unit 105a. The refresh of the article list display unit 105a is the effective processing procedure in the case where, for example, an icon indicating the state of already-read or not-read is displayed for each of the article summaries displayed on the article list display unit 105a, or in the case where the unread article summaries displayed on the article list display unit 105a are listed in thick letters, while the read article summaries are listed in thin letters.

(n) Shift to the Sleep Mode

The above processings described in (i) to (m) are the details of the processing in the normal mode of the RSS reader program 103. In the case where the event receiver 123 receives an event different from any of the foregoing events (for example, in the case where a timer event is detected which is generated when an operation from the user has not been carried out for a fixed time, or in the case where a user event is detected which is generated when the user uses the operation unit 107 to give an instruction of minimization of the window of the RSS reader program 103) (step S135: No route), the procedure proceeds to the processing of the sleep mode shown in FIG. 25 through terminal 3.

(5) Operation in Sleep Mode

Figure 25:
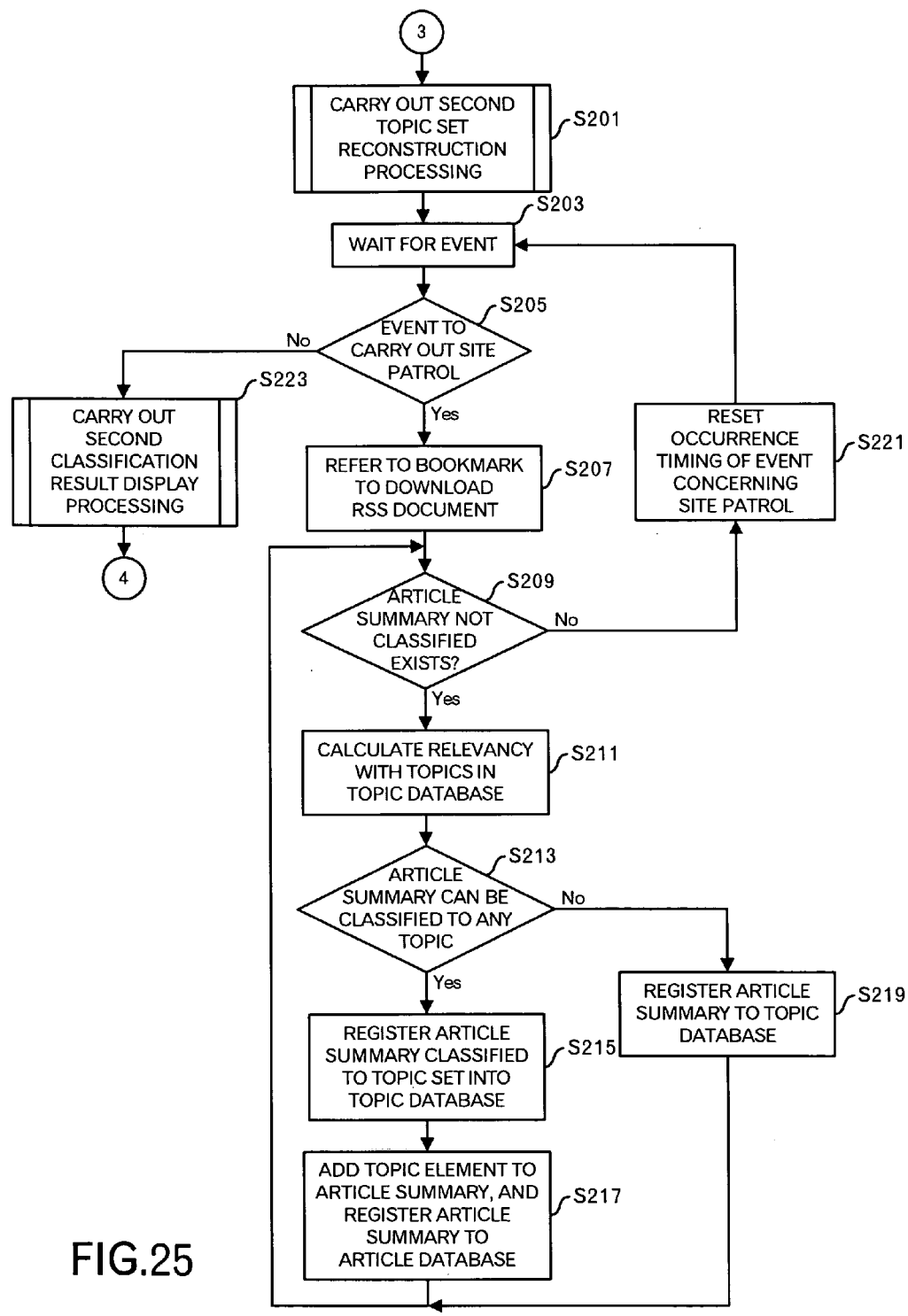
FIG. 25 is a diagram showing a second basic operation processing of a program in a sleep mode.

FIG. 25 shows the basic flow of the operation of the RSS reader program 103 in the sleep mode. First, the RSS reader program 103 switches the operation mode. In detail, the event receiver 123 notifies the article collector 115 that the operation mode is switched to the operation of the sleep mode. In response to the notification, the article collector 115 temporarily stops the site patrol processing, that is, the acquisition processing of RSS documents. Further, the operation mode is switched so that when the temporarily stopped processing is resumed, the acquired RSS document is not stored in the article database 137, but is delivered to the topic classifier 133. Next, the following processing described in (p) is executed.

(p) The topic reconstructor 131 executes "second topic set reconstruction processing" (step S201). This processing will be described later in detail. When the second topic set reconstruction processing is ended, the event receiver 123 watches and waits for the occurrence of an event (step S203). When the event occurs, the event receiver 123 judges the content of the occurring event, and instructs, according to the content, the respective processing units in the RSS reader program 103 to carry out processing. The processing executed by the respective processing units having received the processing execution instruction is the following processing described in (q) or (r).

(q) In the case where the occurring event is the event relating to "site periodic patrol" (step S205: Yes route), the article collector 115 and the topic classifier 133 carry out a series of second article classification processings (step S207 to S221). When the series of second article classification processings are ended, the event receiver 123 watches and waits for the occurrence of an event (step S203).

(r) In the case where the occurring event is the event relating to "return to normal mode" (step S205: No route), the classification result extractor 135 executes "second classification result display processing" (step S223). Incidentally, because the details of the second classification result display processing are quite the same as the classification result display processing of the first embodiment of the invention described in the description of FIGS. 15 and 16, the description will be omitted. Next, the RSS reader program 103 carries out the second switching of the operation mode. In detail, the event receiver 123 notifies the article collector 115 that the operation mode is switched to the normal mode, and the article collector 115 switches the operation mode according to the notification. That is, the operation of the article collector 115 in which the article summary relating to the acquired RSS document is delivered to the topic classifier 133 is switched to the operation in which the article summary relating to the acquired RSS document is stored in the article database 137. Then, the procedure proceeds to the processing of the normal mode shown in FIG. 19 through terminal 4.

(p) Second Topic Set Reconstruction Processing

Figure 26:
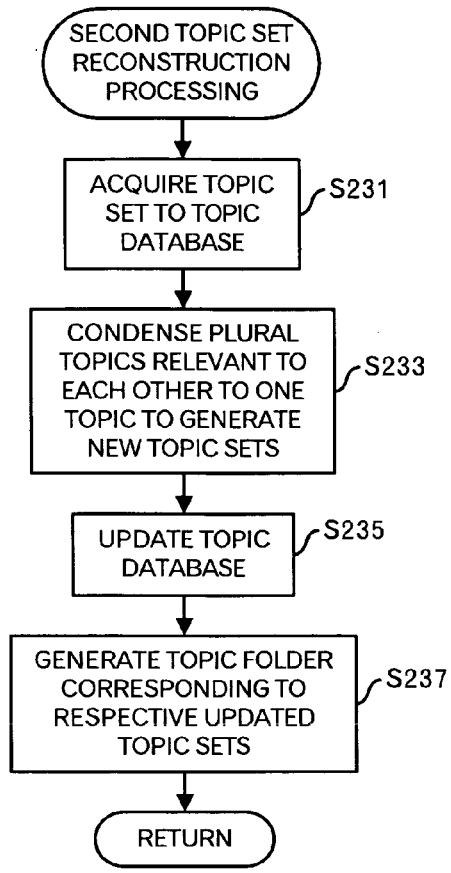
FIG. 26 is a diagram showing a second topic set reconstruction processing.
Figure 27:
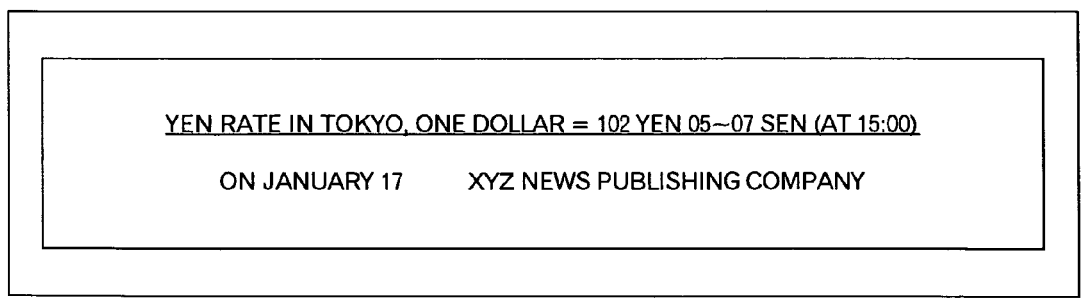
FIG. 27 is a diagram illustrating a program window of a conventional ticker type RSS reader.

FIG. 26 shows the detailed procedure of the second topic set reconstruction processing. Incidentally, because steps S231 to S235 in this drawing are quite the same as those described in the description of FIG. 13, their description will be omitted. The RSS reader program 103 in the second embodiment of the invention is different from the first embodiment in that the topic reconstructor 131 executes a processing to generate a topic folder corresponding to each of the updated topic sets (step S237).

Here, "topic folder" is one of the folders displayed on the folder display part 153 as shown in FIG. 18, and folders denoted by 169c and 169d are the topic folders. In the processing to generate the topic folder, the topic folder is initialized, reference is made to the topic set stored in the topic database 127, and the folder corresponding to the topic set is generated as shown in FIG. 18. Specifically, data relating to the topic folder of the folder information 143 is initialized, the content of the topic element of the topic set stored in the topic database 127 is acquired, and the content of the acquired topic element is registered in the storage area of data relating to the topic folder of the folder information 143. Besides, the folder corresponding to the topic element registered in the folder information 143 is made to be displayed on the topic folder display part 159. In FIG. 18, the topic folders concerning a topic C and a topic D are generated and displayed. In FIG. 18, the topic folders are recited as "topic C" and "topic D" in order to distinguish them from the user definition folder. Actually, based on the content of the topic element, a word such as, for example, "disease", "sport", or "economy" is displayed.

(q) Second Article Classification Processing

The series of second article classification processings (step S207 to S221) shown in FIG. 25 are basically similar to the series of article classification processings (step S77 to S91) shown in FIG. 11. Because the difference from FIG. 11 is a processing (step S217 and S219) carried out after the judgment of step S213, here, only the processing step will be described, and the description of other steps will be omitted.

(q-1) Processing Step S217

In the case where the topic classifier 133 judges that the article summary can be classified into one of the topic sets stored in the topic database 127 (step S213: Yes route), the processing (S215) in which the topic classifier 133 gives the topic element to the article summary and registers it in the topic database 127 is quite the same as the processing step S85 of FIG. 11. In the case of the second embodiment of the invention, the topic classifier 133 registers the article summary to which the topic element is given into the article database 137 as well (step S217). In the case where the user selects a certain topic folder after the RSS reader program 103 is returned to the normal mode by such registration, the article summary belonging to the selected topic folder is displayed on the article list display part 161.

(q-2) Processing Step S219

In the case where the topic classifier 133 judges that the article summary is not classified in any of the topic sets stored in the topic database 127 (step S213: No route), the topic classifier 133 does not give the topic element to the article summary, but registers the article summary in the article database 137 (step S219). In the mail-client type RSS reader which has a richer user interface and aims at storing and managing the article summaries, even in the case where the article summary can not be classified into the topic set, it is better to store the article summary in the article database 137.

As described above, in the management method of the article summary in the conventional mail-client type RSS reader, that is, in the folder management function by the user definition folder and the keyword retrieval function, there have been problems that information management cost is high, and it is not suitable for the purpose of watching information. Then, in the program window of the RSS reader program 103 of the second embodiment of the invention, as shown in FIG. 18, in addition to the conventional site folder display part 155 and the user definition folder display part 157, the topic folder display part 159 including the topic folders 169c and 169d is disposed. When the user selects the topic folder 169c or 169d, the article summaries included in the selected topic folder are listed on the article list display part 161. Besides, in the inner processing of the RSS reader program 103, after the topic set is reconstructed, the respective topic folders displayed on the topic folder display part 159 are in one-to-one relation with new topic sets stored in the topic database 127, and are displayed on the topic folder display part 159. Further, in the case where the article summary acquired from the article providing site can be classified into one of the topic sets, the article summary is made to be included in the topic set and is managed. Thus, the user can efficiently get the article summary without performing management by the conventional management method with the user definition folder and the like.

Modified Example of the Second Embodiment of the Invention

The series of processings executed when the RSS reader program 103 shifts to the sleep mode, that is, the second topic set reconstruction processing of the topic database 127 carried out by the topic set reconstructor 131, and the classification processing of the article summaries into the topic set carried out by the topic classifier 133 are not limited to be executed in the sleep mode, but may be executed by the instruction from the user in the normal mode. Alternatively, when the RSS reader program is activated, the series of processings may be carried out.

Although the embodiments of the invention have been described, the invention is not limited to these. For example, each of the functional blocks of the functional block diagrams shown in FIGS. 1 and 17 do not necessarily correspond to each of actual program modules.

Figure 28:
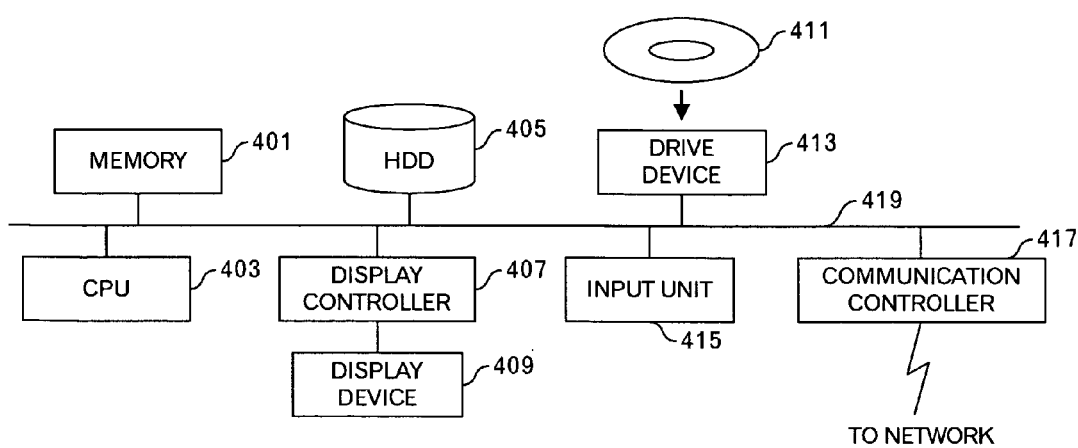
FIG. 28 is a block diagram of a computer.

In addition, the computer 1 is a computer device as shown in FIG. 28. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. An article reader program embodied on a medium, said article reader program comprising:
    detecting that display of data concerning a first article is instructed by a user;
    calculating an article relevance degree between said first article and a second article;
    extracting a second article whose article relevance degree with said first article satisfies a predetermined condition in relation to said first article;
    assigning a top priority to said first article;
    assigning a priority lower than said top priority of said first article to the extracted second article;
    grouping said first article and the extracted second article as a first topic;
    displaying said data concerning said first article and data concerning the extracted second article according to the assigned priorities of said first article and the extracted second article;
    detecting that deletion of said first topic is instructed by said user; and
    deleting data of said first article and the extracted second article, which are grouped as said first topic.

2. The article reader program as set forth in claim 1, wherein said assigning said priority lower than said top priority of said first article to said second article comprises sorting a plurality of the extracted second articles based on said article relevance degrees of the extracted second articles.

3. The article reader program as set forth in claim 1, wherein said calculating comprises:
    calculating a first article similarity degree between said first article and said second article by using a similarity degree function for calculating a similarity degree between two articles; and
    judging whether or not there is relevancy between said first article and said second article based on the calculated first article similarity and a first threshold.

4. The article reader program as set forth in claim 1, wherein said grouping comprises storing said data concerning said first article and said data concerning said second article into a FIFO queue in order of the assigned priorities from a head of said FIFO queue, and said displaying comprises reading out data from said head of said FIFO queue.

5. The article reader program as set forth in claim 4, wherein said grouping further comprises inserting a marker to represent a topic grouping said first article and the extracted second article after said data concerning said second article in said FIFO queue; and
    said deleting comprises deleting data at the head of said FIFO queue to data immediately before said marker.

6. The article reader program as set forth in claim 4, further comprising:
    storing data of a topic including one or a plurality of articles to which same topic information is assigned, into a topic database;
    acquiring data concerning a third article from an article providing site;
    calculating a topic relevance degree between said third article and one or a plurality of topics whose data is stored in said topic database;
    assigning topic information of a topic whose topic relevance degree with said third article satisfies a second predetermined condition to said third article, and storing said data concerning said third article with the assigned topic information into said topic database and said FIFO queue; and
    discarding said data concerning said third article whose topic relevance degrees with any topics do not satisfy said second predetermined condition.

7. The article reader program as set forth in claim 1, further comprising:
    acquiring and storing said data concerning said first article and said data concerning said second article, which include folder information that specifies a first folder, into an article database;
    displaying said first folder on a folder display part of a window;
    in response to a selection of said first folder by said user, filtering data stored in said article database based on said folder information that specifies the selected first folder to acquire and store said data concerning said first article and said data concerning said second article into a spool; and
    displaying a list of said data concerning said first article and said data concerning said second article, which are stored in said spool, on an article list display part of said window.

8. The article reader program as set forth in claim 7, further comprising:
    rearranging said data concerning said first article and said data concerning the extracted second article in said spool according to the assigned priorities of said first article and the extracted second article, and
    wherein said list is updated based on a result of said rearranging.

9. The article reader program as set forth in claim 8, wherein said grouping comprises adding topic information of a specific topic to said data concerning said first article and said data concerning the extracted second article, which are stored in said spool, and
    said deleting comprises deleting data with said topic information of said specific topic from said spool.

10. The article reader program as set forth in claim 9, wherein said deleting further comprises deleting data stored in said article database, said data corresponding to said data deleted from said spool.

11. The article reader program as set forth in claim 7, further comprising:
- storing data of a topic including one or a plurality of articles to which same topic information is assigned, into a topic database;
- acquiring data concerning a third article from an article providing site;
- calculating a topic relevance degree between said third article and one or a plurality of topics whose data is stored in said topic database;
- assigning topic information of a topic whose topic relevance degree with said third article satisfies a second predetermined condition to the third article, and storing said data concerning said third article with the assigned topic information into said topic database and said article database; and
- storing said data concerning said third article whose topic relevance degrees with any topic do not satisfy said second predetermined condition without assigning any topic information into said article data base.

12. The article reader program as set forth in claim 1, further comprising:
- storing data of a topic including one or a plurality of articles to which same topic information is assigned, into a topic database;
- acquiring data concerning a third article from an article providing site;
- calculating a topic relevance degree between said third article and one or a plurality of topics whose data is stored in said topic database; and
- assigning topic information of a topic whose topic relevance degree with said third article satisfies a second predetermined condition to said third article, and storing said data concerning said third article with the assigned topic information into said topic database.

13. The article reader program as set forth in claim 12, wherein said acquiring said third article is carried out in response to detection of shift to a sleep mode.

14. The article reader program as set forth in claim 12, wherein said calculating said topic relevance degree between said third article and one or said plurality of topics comprises:
- calculating a topic similarity degree between said third article and said topic stored in said topic database by using a topic similarity degree function for calculating a topic similarity degree between an article and a topic;
- judging based on the calculated topic similarity degree and a second threshold whether or not said third article and said topic have a first relationship therebetween; and
- determining one topic having a highest topic similarity degree with said third article from a plurality of topics judged to have said first relationship.

15. The article reader program as set forth in claim 12, wherein said calculating said topic relevance degree between said third article and one or said plurality of topics comprises:
- calculating a second article similarity degree between said third article and a fourth article whose data is stored in said topic database by using a similarity degree function for calculating an article similarity degree between two articles;
- judging based on the calculated second article similarity degree and a third threshold whether or not said third article and said fourth article have a second relationship therebetween; and
- determining one article having a highest second article similarity degree with said third article from a plurality of said fourth articles judged to have said second relationship.

16. The article reader program as set forth in claim 12, further comprising:
- acquiring data concerning a first topic, which is stored in said topic database;
- generating a new topic from said first topic and a second topic based on a relevance degree between said first topic and said second topic whose data is stored in said topic database; and
- storing data concerning said new topic into said topic database.

17. The article reader program as set forth in claim 12, further comprising:
- acquiring article data stored in said topic database, in response to detection of a predetermined instruction from the user; and
- displaying the acquired article data for each topic based on the topic information assigned to the acquired article data.

18. An article management method, comprising:
- detecting that display of data concerning a first article is instructed by a user;
- calculating an article relevance degree between said first article and a second article;
- extracting a second article whose article relevance degree with said first article satisfies a predetermined condition in relation to said first article;
- assigning a top priority to said first article;
- assigning a priority lower than said top priority of said first article to the extracted second article;
- grouping said first article and the extracted second article as a first topic;
- displaying said data concerning said first article and data concerning the extracted second article according to the assigned priorities of said first article and the extracted second article;
- detecting that deletion of said first topic is instructed by said user; and
- deleting data of said first article and the extracted second article, which are grouped as said first topic.

19. An article reader, comprising:
- a unit that detects that display of data concerning a first article is instructed by a user;
- a unit that calculates an article relevance degree between said first article and a second article;
- a unit that extracts a second article whose article relevance degree with said first article satisfies a predetermined condition in relation to said first article;
- a unit that assigns a top priority to said first article;
- a unit that assigns a priority lower than said top priority of said first article to the extracted second article;
- a unit that groups said first article and the extracted second article as a first topic;
- a unit that displays said data concerning said first article and data concerning the extracted second article according to the assigned priorities of said first article and the extracted second article;
- a unit that detects that deletion of said first topic is instructed by said user; and
- a unit that deletes data of said first article and the extracted second article, which are grouped as said first topic.

* * * * *